US011269230B2

(12) United States Patent
Coffin et al.

(10) Patent No.: US 11,269,230 B2
(45) Date of Patent: Mar. 8, 2022

(54) BOOST CIRCUIT FOR ELECTROCHROMIC DEVICES

(71) Applicant: KINESTRAL TECHNOLOGIES, INC., Hayward, CA (US)

(72) Inventors: Stephen Coffin, Hayward, CA (US); Douglas F. Brainard, Hayward, CA (US)

(73) Assignee: Pure Storage, Inc., Mountain View, CA (US)

( * ) Notice: Subject to any disclaimer, the term of this patent is extended or adjusted under 35 U.S.C. 154(b) by 393 days.

(21) Appl. No.: 15/685,935

(22) Filed: Aug. 24, 2017

(65) Prior Publication Data

US 2018/0059498 A1 Mar. 1, 2018

Related U.S. Application Data

(60) Provisional application No. 62/379,085, filed on Aug. 24, 2016.

(51) Int. Cl.
| | |
|---|---|
| *G02F 1/163* | (2006.01) |
| *H02M 3/04* | (2006.01) |
| *H02J 1/04* | (2006.01) |
| *H02J 1/08* | (2006.01) |
| *G05F 1/563* | (2006.01) |
| *E06B 9/24* | (2006.01) |
| *G02F 1/1523* | (2019.01) |

(52) U.S. Cl.
CPC .............. *G02F 1/163* (2013.01); *H02M 3/04* (2013.01); *E06B 2009/2464* (2013.01); *G02F 1/1525* (2013.01); *G05F 1/563* (2013.01); *H02J 1/04* (2013.01); *H02J 1/084* (2020.01)

(58) Field of Classification Search
CPC ........ G05F 1/563; G02F 1/163; G02F 1/1525; H02J 1/084; H02J 1/04; H02J 1/082; H02J 50/00; H02M 3/04; E06B 2009/2464

See application file for complete search history.

(56) References Cited

U.S. PATENT DOCUMENTS

| | | | |
|---|---|---|---|
| 4,512,637 A | | 4/1985 | Ballmer |
| 4,969,229 A | * | 11/1990 | Svanberg .............. A47L 9/2842 15/339 |
| 5,365,365 A | * | 11/1994 | Ripoche .................. G02F 1/163 345/105 |
| 5,455,637 A | | 10/1995 | Kallman et al. |
| 5,900,720 A | | 5/1999 | Kallman et al. |
| 5,978,126 A | * | 11/1999 | Sjursen .................. G02F 1/163 351/44 |

(Continued)

FOREIGN PATENT DOCUMENTS

WO 2012165316 A1 6/2012

OTHER PUBLICATIONS

Extended European Search Report in application No. 17844443.6 dated Feb. 1, 2020.

*Primary Examiner* — Harry R Behm
(74) *Attorney, Agent, or Firm* — Womble Bond Dickinson (US) LLP

(57) ABSTRACT

An electrochromic device, with an external power supply configured to supply a limited amount of power to the electrochromic device and a boost circuit power supply that is local to the electrochromic device and configured to supply power to the electrochromic device that is larger than the limited amount of power supplied by the external power supply is provided.

16 Claims, 21 Drawing Sheets

(56) References Cited

U.S. PATENT DOCUMENTS

| | | | |
|---|---|---|---|
| 6,567,708 B1 | 5/2003 | Bechtel et al. | |
| 7,085,609 B2 | 8/2006 | Bechtel et al. | |
| 7,215,318 B2 | 5/2007 | Turnbull et al. | |
| 8,018,644 B2 * | 9/2011 | Gustavsson | G02F 1/163 359/296 |
| 9,030,725 B2 | 5/2015 | Pradhan et al. | |
| 9,250,494 B2 | 2/2016 | Podbelski et al. | |
| 2002/0027713 A1 * | 3/2002 | Turnbull | B60R 1/088 359/604 |
| 2003/0234752 A1 * | 12/2003 | Turnbull | B60R 1/088 345/49 |
| 2007/0088963 A1 * | 4/2007 | Nakaya | G03G 15/2039 713/300 |
| 2008/0115428 A1 * | 5/2008 | Schlam | E06B 9/24 52/173.1 |
| 2011/0148218 A1 | 6/2011 | Rozbicki | |
| 2012/0287496 A1 * | 11/2012 | Nagel | G02F 1/163 359/267 |
| 2013/0076057 A1 | 3/2013 | Hagen | |
| 2014/0124601 A1 * | 5/2014 | Imai | F02D 41/20 239/585.1 |
| 2015/0002919 A1 * | 1/2015 | Jack | G09G 3/19 359/275 |
| 2016/0202588 A1 * | 7/2016 | Bass | G02F 1/155 359/265 |
| 2016/0202590 A1 * | 7/2016 | Ziebarth | B60R 1/088 359/239 |
| 2017/0063150 A1 * | 3/2017 | Sakamoto | H01M 10/425 |
| 2017/0097553 A1 * | 4/2017 | Jack | G02F 1/0121 |
| 2017/0210413 A1 * | 7/2017 | Tsujioka | B62D 5/046 |
| 2017/0271661 A1 * | 9/2017 | Yasuda | H01M 4/131 |
| 2017/0334376 A1 * | 11/2017 | Chen | H02J 7/1438 |

* cited by examiner

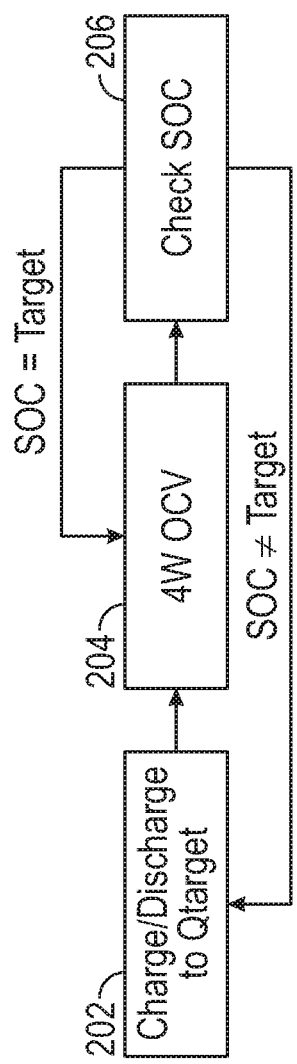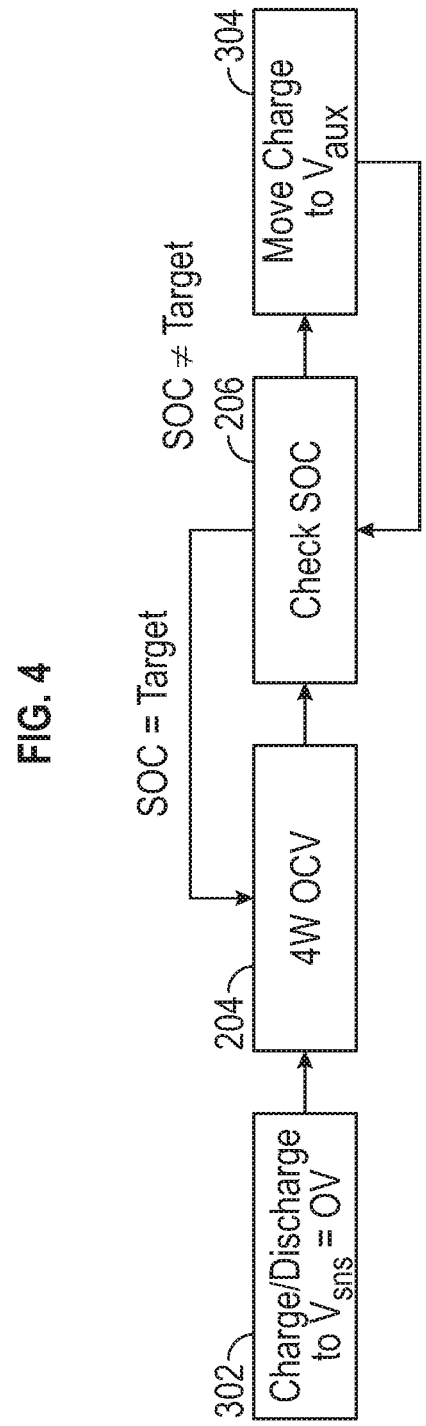
FIG. 4
FIG. 5

BOOST CIRCUIT FOR ELECTROCHROMIC DEVICES

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering event and are also often used in automobile rearview mirrors to reduce reflective glare. Controllers or drivers for electrochromic devices generally apply voltage and current of one polarity to charge the device and decrease optical transmissivity and the opposite polarity to discharge the device and increase the optical transmissivity.

The transmissivity change for current systems is relatively slow and non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in applied voltage between the center and edge decreases and, as a result, the difference in transmissivity at the center and edge of the device decreases.

One method of improving the switching speed of a large electrochromic device is to supply more power to the electrochromic device. However, there are several challenges that supplying large amounts of power introduces. The electrochromic device can be damaged by large amounts of power. The non-uniformity of the transmission of the electrochromic device during switching (e.g., the iris effect) can be exacerbated. Cables and power supplies required to supply a large amount of electrical power also need to be large, which introduces added cost to the system.

What is therefore desired is a system and method for supplying power to an electrochromic device that can enable fast and uniform switching in a variety of conditions with minimal added cost. It is within this context that the embodiments arise.

SUMMARY

An electrochromic device, with an external power supply configured to supply a limited amount of power to the electrochromic device and a boost circuit power supply that is local to the electrochromic device and configured to supply power to the electrochromic device that is larger than the limited amount of power supplied by the external power supply is provided. The embodiments reduce the requirement on the size of the external power supply and wires connecting the external power supply to the electrochromic device. Additionally, a method for controlling an electrochromic device, including applying an amount of power to the electrochromic device from an external power supply that is less than or equal to a limited amount of power, determining an amount of power required by the electrochromic device, and supplying power to the electrochromic device from a boost circuit power supply that is local to the electrochromic device, responsive to the amount of power required by the electrochromic device being larger than the limited amount of power is provided.

BRIEF DESCRIPTION OF THE DRAWINGS

To facilitate further description of the embodiments, the following drawings are provided in which:

FIG. 4 is a process diagram depicting operation of the driver of FIG. 3.

FIG. 5 is a process diagram depicting further operation of the driver of FIG. 3.

Figure 1:
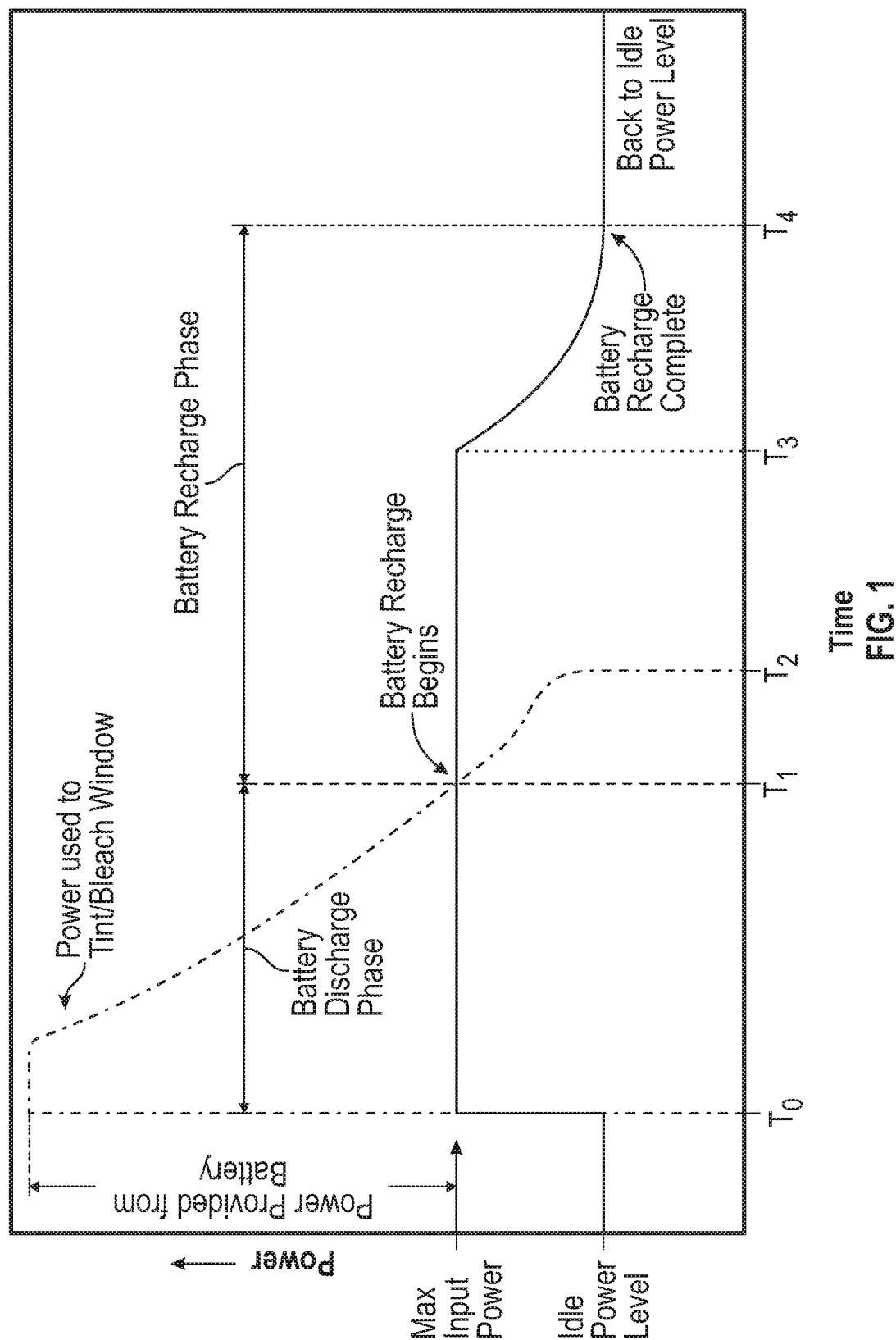
FIG. 1 depicts the power supplied to an electrochromic device over time, including power supplied from a boost circuit.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

ABBREVIATIONS AND DEFINITIONS

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

The terms "anodic electrochromic layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state voltage" refers to the open circuit voltage ($V^{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "coloration efficiency" or "CE" refers to a property of an electrochromic layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed. In the absence of significant changes in reflectivity, this wavelength dependent property can be measured over a transition of interest using the following equation:

$$CE_\lambda = \frac{\log_{10}\left(\frac{T_{ini}}{T_{final}}\right)}{Q_A}$$

where $Q_A$ is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to calculate CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically matched" refers to a set of cathode and anode electrochromic films or materials with similar charge capacities and complementary oxidation states such that when joined together by a suitable ion-conducting and electrically insulating layer, a functional electrochromic device is formed that shows reversible switching behavior over a substantial range of the theoretical charge capacities of the films or materials, respectively.

The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The terms "halide," "halogen" or "halo" as used herein alone or as part of another group refer to chlorine, bromine, fluorine, and iodine.

The term "inorganic electrochromic film" or "inorganic electrochromic material" as used herein describes comprise a film or material, respectively, comprising metals that undergo reversible oxidation and reduction reactions during the cycling of an electrochromic device. Inorganic electrochromic materials and films lack solubility in common organic and neutral aqueous solvents, and typically possess 3-dimension framework structure where the metal ions are bridged to and share counter anions such as oxide, sulfide, nitride and halide, or complex molecular inorganic anions such as phosphate or sulfate. Inorganic electrochromic films comprising metal ions and carbon-containing counter anions in the 3-dimensional lattice are also known. These may be particle-based electrochromic materials. Examples include Prussian Blue, Prussian Blue Analogs, Nitroprusside compounds and other framework compounds comprising metal ions and cyanide anions or other anions similar to cyanide. These systems may also be referred to as organometallic electrochromic materials.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency l_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

The terms "amine" or "amino," as used herein alone or as part of another group, represents a group of formula —$N(R^8)(R^9)$, wherein R are independently hydrogen, hydrocarbyl, substituted hydrocarbyl, silyl, or $R^8$ and $R^9$ taken together form a substituted or unsubstituted cyclic or polycyclic moiety, each as defined in connection with such terms, typically having from 3 to 8 atoms in the ring. "Substituted amine," for example, refers to a group of formula —$N(R^8)(R^9)$, wherein at least one of $R^8$ and $R^9$ are other than hydrogen. "Unsubstituted amine," for example, refers to a group of formula —$N(R^8)(R^9)$, wherein $R^8$ and $R^9$ are both hydrogen.

The term "aryl" as used herein alone or as part of another group denotes optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "halide," "halogen" or "halo" as used herein alone or as part of another group refer to chlorine, bromine, fluorine, and iodine.

The term "lap shear strength" as used herein refers to the stress point at which either adhesive or cohesive failure occurs.

The term "silyl" as used herein describes substituents of the general formula —$Si(X^8)(X^9)(X^{10})$ where $X^8$, $X^9$, and $X^{10}$ are independently hydrocarbyl or substituted hydrocarbyl.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters, ethers, and thioethers.

DETAILED DESCRIPTION

Electrochromic Device Power Supply

This disclosure describes an electrochromic device, with an external power supply configured to supply a limited amount of power to the electrochromic device and a boost circuit power supply that is local to the electrochromic device and configured to supply power to the electrochromic device that is larger than the limited amount of power supplied by the external power supply. This is useful for a number of reasons including reducing the requirement on the size of the external power supply and wires connecting the external power supply to the electrochromic device. Additionally, this disclosure describes a method for controlling an electrochromic device, including applying an amount of power to the electrochromic device from an external power supply that is less than or equal to a limited amount of power, determining an amount of power required by the electrochromic device, and supplying power to the electrochromic device from a boost circuit power supply that is local to the electrochromic device, responsive to the amount of power required by the electrochromic device being larger than the limited amount of power.

Additionally, the electrochromic device can contain a driver, with a power supply control module configured to perform actions such as supplying constant current from the external power supply and the boost circuit power supply to the electrochromic device, stopping the supplying the constant current when one of a sense voltage of the electrochromic device attains a sense voltage limit or an amount of charge transferred to the electrochromic device attains a target amount of charge, and controlling one of a variable voltage or a variable current from the external power supply, the boost circuit power supply, or both power supplies to the electrochromic device to maintain the sense voltage at the sense voltage limit while the amount of charge transferred to the electrochromic device is less than the target amount of charge.

In some embodiments described herein, the electrochromic device is an electrochromic window or door. In some embodiments, the electrochromic device is an electrochromic window or door and the boost circuit power supply is located inside of the frame or IGU. This may be of particular value in instances where the electrochromic window or door is moveable because the electrochromic device may still be powered in any position, particularly when it is in an open position and may be disconnected from hard wiring. In this embodiment, the boost circuit power supply located inside of the electrochromic window or door may or may not be in combination with a driver that is also inside of the electrochromic window or door. In some embodiments the boost circuit power supply is separate from the electrochromic window. If separate from the electrochromic window or door, then the boost circuit may be integrated into the driver. In an embodiment where one boost circuit supplies more than one driver, the boost circuit may be in a cabinet or other housing along with the drivers or in any location local to the drivers and the electrochromic device. Electrical power is supplied to an electrochromic device to charge and discharge the device. Charging and discharging the device changes the transmissivity of the device from one optical transmission state to another. An external power supply can be located away from the electrochromic device (i.e., greater than 10 m away). The external power supply can be connected to the electrochromic device with wires (i.e., cables). In some cases, one external power supply can supply power to a number of electrochromic devices. For a large fraction of the time, the electrochromic device is in an idle state (i.e., not switching) and the idle power supplied to the electrochromic device is small. During switching, the amount of power supplied to the electrochromic device can be many times larger than the idle power level.

Two power supplies can be used in an electrochromic device: an external power supply and a boost circuit power supply. In some embodiments, the boost circuit power supply can include a rechargeable battery, with enough capacity to switch the electrochromic device one or more times. The boost circuit power supply can be located close to (i.e., local to) to the electrochromic device (i.e., less than 1 m away). The boost circuit power supply can be connected to the electrochromic device with wires (i.e., cables). The external power supply can be used to supply a "limited amount of power" to the electrochromic device, but not more than the "limited amount of power". The boost circuit power supply can be used to supply power to the electrochromic device that is larger than the "limited amount of power" supplied by the external power supply. The external power supply can be relatively small compared to the boost circuit power supply. The maximum power output of the external power supply can be small compared to the maximum power output of the boost circuit power supply.

There are several advantages to including an external power supply and a boost circuit power supply. The external power supply can be significantly smaller, which reduces the cost of the external power supply, and increases the average efficiency of the external power supply. The average efficiency of the external power supply is improved because most of the time it is supplying idle power to the electrochromic device, and power supplies are typically inefficient at supplying power much lower than the maximum power they are able to supply. The wires connecting the external power supply can be smaller (i.e., larger gauge), which reduces the cost of the wires and can be advantageous for device installation. The smaller wires is particularly advantageous if the external power supply is located far away (i.e., greater than 10 m away), and the boost circuit power supply is located close to the electrochromic device (i.e., less than 1 m away).

FIG. 1 depicts the power supplied to an electrochromic device over time. The y-axis is power, and the x-axis is time. The solid curve is the power supplied from the external power supply. The dotted curve is the power required to charge (or discharge) the electrochromic device during switching. At times less than $t_0$ the electrochromic device is in an idle state, and the power supplied by the external power supply is the idle power level. At time $t_0$ the electrochromic device begins switching from one optical transmission state to another optical transmission state (i.e., charging or discharging) and the power required is greater than the maximum input power that can be supplied by the external power supply (i.e., the limited amount of power, or the max input power). Since the power required at time $t_0$ is greater than the limited amount of power (i.e., the max input power), the boost circuit power supply supplies power to the electrochromic device. In some cases, when the power required by the electrochromic device is greater than the limited amount of power that can be supplied from the external power supply, the power can be supplied by both the external power supply and the boost circuit power supply. The power required by the electrochromic device between time $t_0$ and time $t_1$ reaches a maximum, and then begins to decrease. In some cases, there may be a plateau of high power required by the electrochromic device, and a period requiring decreasing levels of power. At time $t_1$ the power required by the electrochromic device decreases below the limited amount of power that can be delivered by the external power supply, and at that point the power supplied to the electrochromic device can be supplied by the external power supply alone. At time $t_2$, the electrochromic device no longer requires power for switching from one optical transmission state to another optical transmission state, however, some power may still be required from the electrochromic device to maintain the given state of optical transmission.

In some embodiments, the boost circuit power supply includes a rechargeable battery. After time $t_1$, the amount of power required by the electrochromic device is less than the limited amount of power that can be supplied by the external power supply, and the external power supply can begin to recharge the battery for the boost circuit power supply. In some cases, at time $t_3$ the battery is close to being fully charged, and the power supplied to recharge the battery for the boost circuit power supply is reduced. At time $t_4$, the battery is fully charged, and the external power supply can stop providing power to the battery for the boost circuit power supply. At time $t_4$, the external power supply can return to providing the idle power level.

In some cases, the electrochromic device external power supply recharges the battery of the boost circuit power supply, and reduces the power supplied to charge the battery when the battery is more than 70% charged, or more than 80% charged or more than 90% charged, or more than 95% charged.

Figure 2:
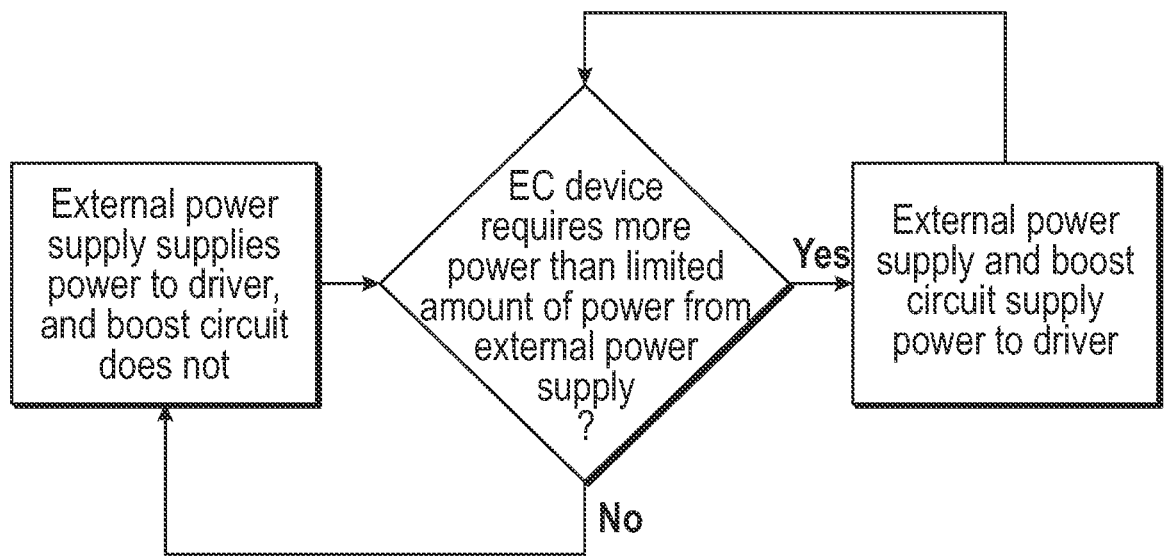
FIG. 2 is a process diagram depicting operation of an electrochromic device with an external power supply and a boost circuit power supply.

FIG. 2 is a process diagram depicting operation of an electrochromic device with an external power supply and a boost circuit power supply. The central question is if the electrochromic device requires more power than the limited amount of power that can be supplied from the external power supply. If the answer is no, and the power required by the electrochromic device is less than the limited amount of power that can be supplied from the external power supply, then the power can be supplied by the external power supply alone. If the answer is yes, and the power required by the electrochromic device is more than the limited amount of power that can be supplied from the external power supply, then the power can be supplied by the boost circuit power supply. In some embodiments, if the answer is yes, and the power required by the electrochromic device is more than the limited amount of power that can be supplied from the external power supply, then the power can be supplied by the external power supply and the boost circuit power supply together.

The electrochromic device with an external power supply and a boost circuit power supply can be configured such that the external power supply supplies less than 5% of the maximum power used by the electrochromic device, or less than 10% of the maximum power used by the electrochromic device, or less than 15% of the maximum power used by the electrochromic device, or less than 20% of the maximum power used by the electrochromic device, or less than 25% of the maximum power used by the electrochromic device, or less than 30% of the maximum power used by the electrochromic device, or from 1 to 5% of the maximum power used by the electrochromic device, or from 1 to 10% of the maximum power used by the electrochromic device, or from 1 to 15% of the maximum power used by the electrochromic device, or from 1 to 20% of the maximum power used by the electrochromic device, or from 1 to 25% of the maximum power used by the electrochromic device, or from 1 to 30% of the maximum power used by the electrochromic device.

The electrochromic device with an external power supply and a boost circuit power supply can have a boost circuit power supply containing a lithium iron phosphate battery. The electrochromic device with an external power supply and a boost circuit power supply can have a boost circuit power supply containing a lithium iron phosphate battery with a capacity from 100 to 10000 mAh, or from 100 to 5000 mAh, or from 100 to 2500 mAh, or from 100 to 1500 mAh, or from 500 to 10000 mAh, or from 1000 to 10000 mAh, or from 1000 to 5000 mAh, or from 1000 to 2500 mAh, or from 1000 to 1500 mAh.

In some embodiments, the electrochromic device with an external power supply and a boost circuit power supply can have a boost circuit power supply containing a lithium iron phosphate battery with a capacity capable of fully charging and discharging the electrochromic device more than 1 time, or more than 2 times, or more than 3 times, or more than 4 times, or more than 5 times, or more than 10 times, or from 1 to 10 times, or from 1 to 5 times, or from 2 to 5 times, or from 3 to 5 times.

In some embodiments, the electrochromic device with an external power supply and a boost circuit power supply can have a boost circuit power supply containing a lithium iron phosphate battery that is operated such that the battery is in shallow discharge operation. In some embodiments, the electrochromic device with an external power supply and a boost circuit power supply can have a boost circuit power supply containing a lithium iron phosphate battery that is operated such that the battery charge does not drop below 60% of its full capacity, or below 70% of its full capacity, or below 80% of its full capacity or below 90% of its full capacity. In some embodiments, the electrochromic device with an external power supply and a boost circuit power supply can have a boost circuit power supply containing a lithium iron phosphate battery that is operated such that the battery charge does not drop below 60% of its full capacity, or below 70% of its full capacity, or below 80% of its full capacity or below 90% of its full capacity during a typical device charge or discharge cycle. In some embodiments, the electrochromic device with an external power supply and a boost circuit power supply can have a boost circuit power supply containing a lithium iron phosphate battery that is operated such that the battery charge does not drop below 60% of its full capacity, or below 70% of its full capacity, or below 80% of its full capacity or below 90% of its full capacity during a charge or discharge cycle that changes the device from a state of maximum optical transmission to a state of minimum optical transmission.

In some embodiments, the electrochromic device with an external power supply and a boost circuit power supply can have a boost circuit power supply containing a lithium iron phosphate battery with a battery lifetime greater than 5 years, or greater than 10 years, or greater than 15 years, or greater than 20 years, or from 1 to 20 years, or from 1 to 15 years, or from 1 to 10 years, or from 5 to 20 years, or from 5 to 15 years. In some embodiments, the electrochromic device with an external power supply and a boost circuit power supply can have a boost circuit power supply containing a lithium iron phosphate battery with a battery lifetime greater 1000 cycles, or greater than 2000 cycles, or greater than 3000 cycles, or greater than 5000 cycles, or greater than 10000 cycles, or greater than 20000 cycles, or from 1000 to 20000 cycles, or from 1000 to 10000 cycles.

The electrochromic device with an external power supply and a boost circuit power supply can have a boost circuit power supply containing any type of rechargeable battery. More specifically, the electrochromic device with an external power supply and a boost circuit power supply can have a boost circuit power supply containing a lithium iron phosphate battery, or a NiCd battery, or a Ni-metal hydride battery, or a lead acid battery, or a Li-ion battery, or a Li-ion polymer battery, or a Li-ion polymer battery with Co, or a Li-ion polymer battery with Mn, or a Li-ion polymer battery with a phosphate, or a rechargeable alkaline battery, or a Li-sulfur battery, or a Na-ion battery, or a thin film Li battery, or a ZnBr battery, or a ZnCe battery, or a V redox battery, or a Na-sulfur battery, or a molten salt battery, or a AgZn battery. Any of the batteries in the device in the previous list can have a capacity from 100 to 10000 mAh, or from 100 to 5000 mAh, or from 100 to 2500 mAh, or from 100 to 1500 mAh, or from 500 to 10000 mAh, or from 1000 to 10000 mAh, or from 1000 to 5000 mAh, or from 1000 to 2500 mAh, or from 1000 to 1500 mAh.

The electrochromic device with an external power supply and a boost circuit power supply can have a boost circuit power supply containing any type of electrical energy storage. More specifically, the electrochromic device with an external power supply and a boost circuit power supply can have a boost circuit power supply containing solid state batteries including a range of electrochemical batteries and capacitors or supercapacitors or ultracapacitors, or flow batteries including batteries where the energy is stored directly in the electrolyte solution, or Flywheels including mechanical devices that harness rotational energy to deliver instantaneous electricity, or compressed air energy storage, or superconducting magnetic energy storage, or.

The electrochromic device with an external power supply and a boost circuit power supply can have an external power supply that is located a distance away from the electrochromic device that is more than 1 m, or more than 2 m or more than 5 m, or more than 10 m, or more than 15 m, or more than 20 m, or more than 30 m, or more than 40 m, or more than 50 m, or more than 100 m, or from 1 to 1000 m, or from 1 to 100 m, or from 1 to 50 m, or from 1 to 20 m, or from 10 to 1000 m, or from 10 to 100 m or from 10 to 50 m. The electrochromic device with an external power supply and a boost circuit power supply can have an boost circuit power supply that is located a distance away from the electrochromic device that is less than 10 m, or less than 5 m, or less than 4 m, or less than 3 m, or less than 2 m, or less than 1 m, or less than 0.1 m, or less than 0.01 m, or from 0.001 to 10 m, or from 0.001 to 5 m, or from 0.001 to 1 m, or from 0.001 to 0.1 m, or from 0.1 to 10 m, or from 0.1 to 5 m, or from 0.1 to 1 m.

The electrochromic device with an external power supply and a boost circuit power supply can have wires connecting the external power supply to the electrochromic device with AWG gauge greater than 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or from 15 to 40, or from 20 to 40, or from 25 to 40, or from 30 to 40, or from 35 to 40, or from or from 15 to 25, or from 15 to 30, or from 20 to 25, or from 20 to 30.

The electrochromic device with an external power supply and a boost circuit power supply can have an external power supply configured to supply power wirelessly to the electrochromic device. In such a system the external power supply might not have any wires connecting it to the electrochromic device. The electrochromic device with an external power supply and a boost circuit power supply can have an external power supply configured to supply power wirelessly to the electrochromic device using non-radiative techniques, such as near-field coupling inductive (magnetic) coupling, or near-field resonant inductive coupling, or near-field capacitive coupling, or near-field resonant capacitive coupling, or atmospheric plasma channel coupling, or magnetodynamic coupling, or using far-field radiative techniques such as microwaves or lasers to wireless transmit the power.

The electrochromic device with an external power supply and a boost circuit power supply can switch from a maximum optical transmissivity to a minimum optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes. The electrochromic device with an external power supply and a boost circuit power supply can switch from a first optical transmissivity to a second optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes.

The boost circuit power supply can also provide power in situations when the electrochromic device is cut off or disconnected from the external power supply. Such situations could include a power failure of the power provided to the external power supply, or a failure of the external power supply. In some cases, the electrochromic device could be disconnected from the external power supply by a user action. For example, if the electrochromic device is part of an electrochromic window or door assembly, then the assembly may be configured to disconnect the electrochromic device from the external power supply when it is opened. In these situations, the boost circuit power supply could provide power to the electrochromic device to switch the device from a first transmissivity state to a second transmissivity state, or provide power to maintain the electrochromic device in a certain transmissivity state.

Electrochromic Device Driver

A driver for electrochromic devices such as electrochromic glass is described below. The driver can charge and discharge an electrochromic device reliably, repeatedly and without exceeding a safe operating realm for the device. In order to do so, the driver can monitor a level of electric charge that is transferred to the electrochromic device, and provides a constant current to the electrochromic device so long as a sense voltage does not exceed a limit. If the sense voltage limit is reached the driver changes to a variable voltage, or a variable current, that is applied to keep the sense voltage at the sense voltage limit. The embodiments described in more detail below protect the electrochromic device from damage. In some cases, voltage and current application cease when the amount of charge transferred to the electrochromic device meets a target amount of charge. In some cases, this is when the electrochromic device is at, or assumed to be at, a target level of optical transmissivity. Various embodiments may have multiple power supplies or a single, more complex power supply, and have analog or digital components for determining charge transfer and controlling the power supply or supplies. In some embodiments, the electrochromic device has an external power supply and a boost circuit power supply connected to the driver to charge and discharge the electrochromic device.

In most circumstances, the device maintains charge neutrality, and charge is merely moved from one electrode to the other. It follows that the amount of charge transferred to the device is the amount of electrons transferred to the device through one bus bar alone. During switching, electrons are transferred to the device through one bus bar, and an equivalent amount of electrons will be transferred from the device through the other bus bar to maintain charge neutrality. In some cases, the amount of charge transferred to the device will be defined as 0% when all of the transportable charge within the device resides in the anode, and 100% when all of the transportable charge within the devices resides in the cathode. Transportable charge is the amount of charge that can move in the system at a particular device voltage. Certain degradation mechanisms can increase or decrease the total transportable charge in the device (e.g., spurious oxidation), however, this excess charge will be periodically eliminated via the sequestration process (described more completely herein).

Figure 3:
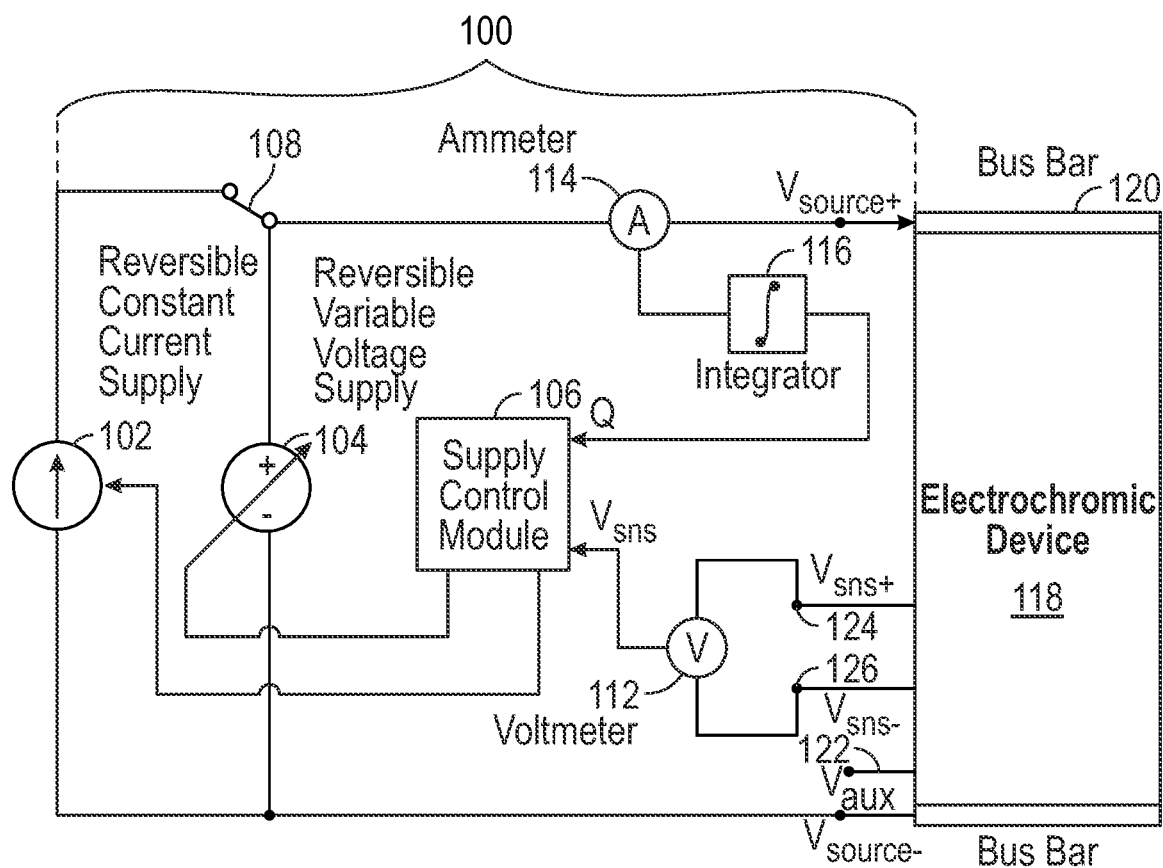
FIG. 3 is a system diagram of a driver and an electrochromic device, in accordance with an embodiment of the present disclosure.

FIG. 3 is a system diagram of a driver 100 and an electrochromic device 118, in accordance with some embodiments. The driver 100 applies a constant current from a reversible constant current supply 102 to the electrochromic device 118 during certain phases of operation, and applies a variable voltage from a reversible variable voltage supply 104 to the electrochromic device 118 during further phases of operation. Voltage and current are generally applied to the bus bars 120 of the electrochromic device 118, although in some embodiments of the electrochromic device 118, a charge sequestration terminal "SEQ" (labeled Vaux) 122 is available for further operation, e.g., to sequester charge. In the embodiment shown, one of the bus bars 120 is labeled "VSOURCE+" and another one of the bus bars 120 is labeled "VSOURCE−", so that polarity of the reversible constant current supply 102 and polarity of the reversible variable voltage supply 104 can be determined relative to the bus bar 120 connections. It should be appreciated that the term "reversible" refers to the polarity of the current from the reversible constant current supply 102 as being able to be reversed, so that the reversible constant current supply 102 provides current for either charging or discharging the electrochromic device 118. Similarly, polarity of the voltage from the reversible variable voltage supply 104 can be reversed, so that the reversible variable voltage supply 104 provides a variable amount of voltage (or current) for either charging or discharging the electrochromic device 118. Voltage and current of a first polarity are supplied for charging the electrochromic device 118 towards a first transmissivity, and voltage and current of a second polarity are supplied for discharging the electrochromic device 118 towards a second transmissivity.

In certain cases, the electrochromic device includes, in succession, a first substrate, a first electrically conductive layer, a first electrode, an ion conductor, a second electrode, a second electrically conductive layer, and a second substrate. The two bus bars 120 depicted in FIG. 3 can be electrically connected to the two electrically conductive layers, and therefore one bus bar 120 is associated with one electrode (e.g. the anode) and the other bus bar 120 is associated with the other electrode (e.g. the cathode).

A voltmeter 112 measures a sense voltage, labeled "Vsns", at the sense voltage terminals 124, 126 of the electrochromic device 118. One of the sense voltage terminals 124 is labeled "VSNS+", and another one of the sense voltage terminals 126 is labeled "VSNS−", so that polarity of a measurement of the sense voltage can be determined relative to the sense voltage terminals 124, 126. Other labels are readily used. In the embodiment shown, the sense voltage terminals 124, 126 are distinct from the bus bars 120, and are located elsewhere than a location of the bus bars 120. A sense voltage terminal 134 could be connected to an interior region of the electrochromic device 118, or various sense voltage terminals 124, 126, 128, 130, 132 could be located along an edge of the electrochromic device 118. Edge locations may be preferable for a gradient type of electrochromic device 118, in which a transmissivity gradient is produced from top to bottom, bottom to top, left to right, right to left or other arrangement. Interior locations may be preferable to detect whether a bull's-eye effect is present. For example, a sense voltage could be taken across an upper region, a middle region, or a lower region of the electrochromic device 118 through suitable terminals, e.g., pairs of sense voltage terminals 124, 126, 128, 130, 132, and 134. Alternatively, a sense voltage could be taken from a sense voltage terminal 124, 126, 128, 130, 132, 134 relative to one of the bus bars 120. In some cases, the two or more sense voltage terminals (e.g., 124 and 126) are electrically connected to the two electrodes of the device (i.e., the anode and cathode).

Sense voltage terminals located at certain spatial locations of the device would provide a measurement of the cell potential (i.e., voltage between the anode and cathode) of the device at a those spatial locations. In some cases, each sense voltage terminal is designed to have a minimal voltage drop between the electrode (i.e. anode or cathode) and the voltmeter 112. The impedance of the sense circuit between the electrodes and the voltmeter 112 can be high, which will make the reading at the voltmeter 112 be close to the actual voltage condition of the electrode location near the sense voltage terminal. In order to measure a specific location within the device, each sense voltage terminal connections to the electrodes (i.e., anode and cathode) can be electrically isolated from the electrically conductive layers. Electrical isolation of each sense terminal can be beneficial because the electrically conductive layers will provide low resistance connections to many locations of the electrodes.

A pair of sense voltage terminals can be connected to the two electrodes (i.e. anode and cathode) in the same or different locations, when viewed from above. In some cases, one sense voltage terminal is at one location on one electrode, and a second sense voltage terminal is located directly above the first on the other electrode. In some cases, one sense voltage terminal is at one location on one electrode, and a second sense voltage terminal is on the other electrode at a different location that has approximately the same cell potential.

In some cases the sense voltage terminals can be directly connected to the bus bars. In other words, one or both of the sense voltage terminals 124 and/or 126 in FIG. 3 could connect to one or both bus bars 120. In some cases, sense voltage terminal 124 is connected to a bus bar 120 associated with one electrode, and the other sense voltage terminal 126 is connected to the other electrode at a location other than a bus bar 120.

In some cases, there are two or more sets of sense voltage terminals, with each set having two sense voltage terminals, where one is electrically connected to one electrode and the other is electrically connected to the other electrode. More than one set allows two independent measurements of the open circuit voltage to be obtained and compared with each other. This is beneficial since in such examples there is a fail-safe, or redundancy, in the system to protect the system from errors or damaged connections associated with one or more sense voltage terminals.

Ammeter 114 measures current supplied to the electrochromic device 118. In the embodiment shown, the ammeter 114 is in line with the VSOURCE+ bus bar 120, although in further embodiments the ammeter 114 could be in line with the VSOURCE− bus bar 120.

Still referring to FIG. 3, integrator 116 receives the output of the ammeter 114, and integrates this over time to produce a value "Q", which is equal to, proportional to, related to, or represents the amount of charge transferred to the electrochromic device 118 over a span of time. The integrator 116 and the ammeter 114 perform a calculation that determines the total amount of charge as equal to or related to the integral of the current into the electrochromic device 118 from a first time to a second time, i.e., over a span of time or a time interval. It should be appreciated that the polarity of the charge, the polarity of the current and the polarity of the voltage are interrelated, and that a negative amount of charge transferred to the electrochromic device 118 is equivalent to a positive amount of charge transferred from the electrochromic device 118, and a positive amount of charge transferred to the electrochromic device 118 is equivalent to a negative amount of charge transferred from the electrochromic device 118, in some embodiments. The phrase "charge transferred to the electrochromic device 118" can be descriptive of both charging and discharging the electrochromic device 118.

Continuing with FIG. 3, a supply control module 106 receives the charge value "Q" from the integrator 116, receives the sense voltage from the voltmeter 112, and controls the reversible constant current supply 102, the reversible variable voltage supply 104, and a switch 108. The switch selects either the reversible constant current supply 102 or the reversible variable voltage supply 104 and couples the selected power supply to the electrochromic device 118. In the embodiment shown, the switch 108 connects the selected power supply to the ammeter, which is in line with one of the bus bars 120. In further embodiments, the switch could connect the selected power supply directly to the bus bar 120. In further embodiments, the reversible constant current supply 102 can be supplied by the external power supply or the boost circuit power supply or both the external power supply and the boost circuit power supply, and the reversible variable voltage supply 104 can be supplied by the external power supply or the boost circuit power supply or both the external power supply and the boost circuit power supply. The supply control module 106 determines, based on the charge value and the sense voltage, whether to apply current or voltage, and the polarity of current or voltage to apply to the electrochromic device 118. Also, the supply control module 106 determines a target amount of charge to be transferred to the electrochromic device 118 based on the difference between the present transmissivity, or assumed transmissivity, of the electrochromic device 118 and a target transmissivity of the electrochromic device 118 in some embodiments. These functions can be accomplished with tables, algebraic calculations, and/or various algorithms in various embodiments as readily devised in accordance with some embodiments. One example of a relationship between optical transmission state and transferred charge for an exemplary EC device is $T2=T1*10^{(-CE*deltaQ)}$, where T1 is current transmission state, T2 is target transmission state, CE is coloration efficiency (in the units of (optical density*cm$^2$)/C), and deltaQ is the amount of charge to be transferred to change from state T1 to state T2 (in units of C/cm$^2$). For instance, in an exemplary device with a CE of 50 optical density*cm$^2$/C, to change from a state of 90% transmission to 5% transmission would require roughly 25 mC/cm$^2$ be transferred. Various processes and phases of operation of driver 100 are further described below with reference to FIGS. 4-8.

Figure 8:
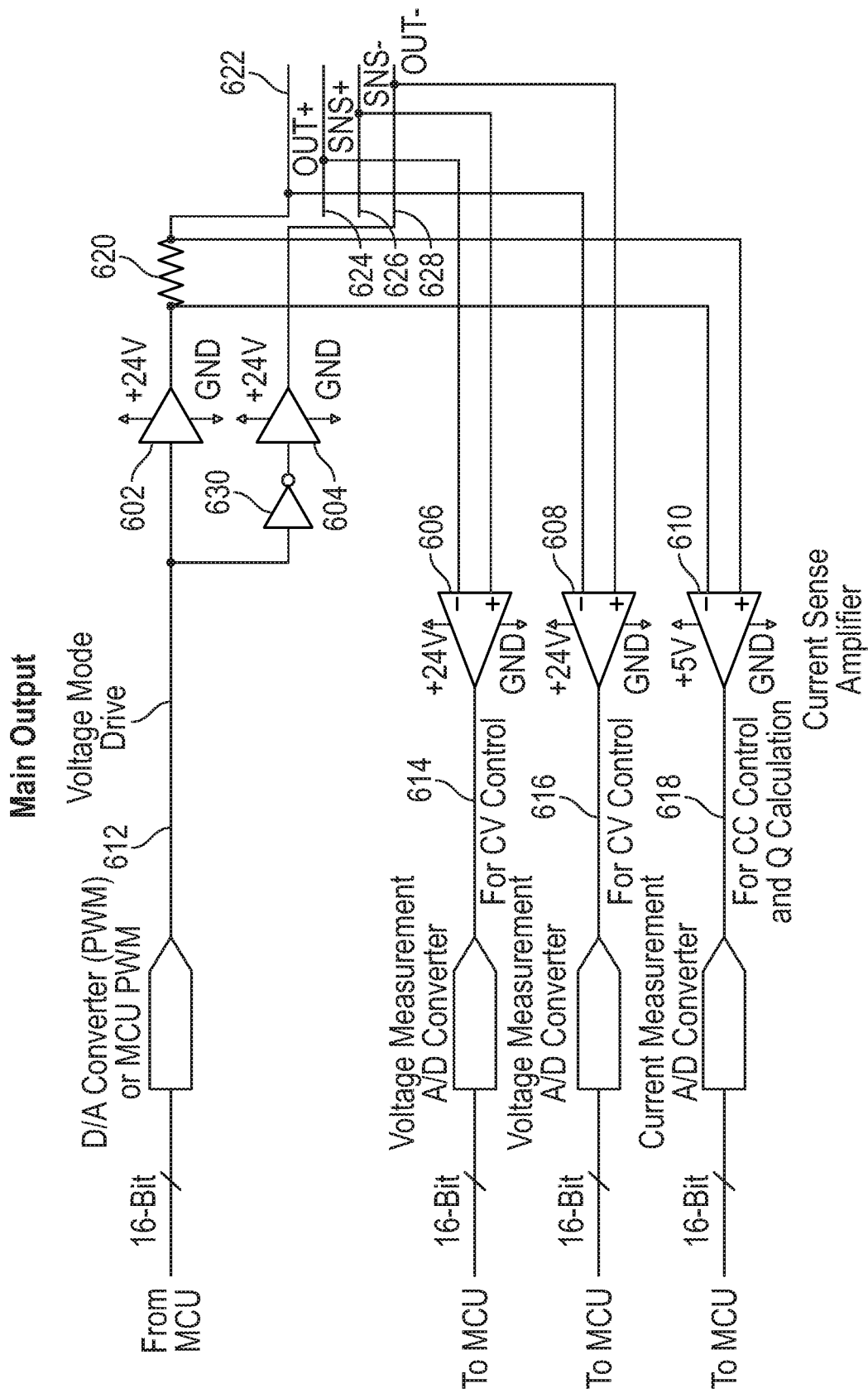
FIG. 8 is a circuit diagram of a power supply and voltage sensing circuit, which are suitable for use in the driver of FIG. 3 to charge and discharge the electrochromic device.
Figure 9:
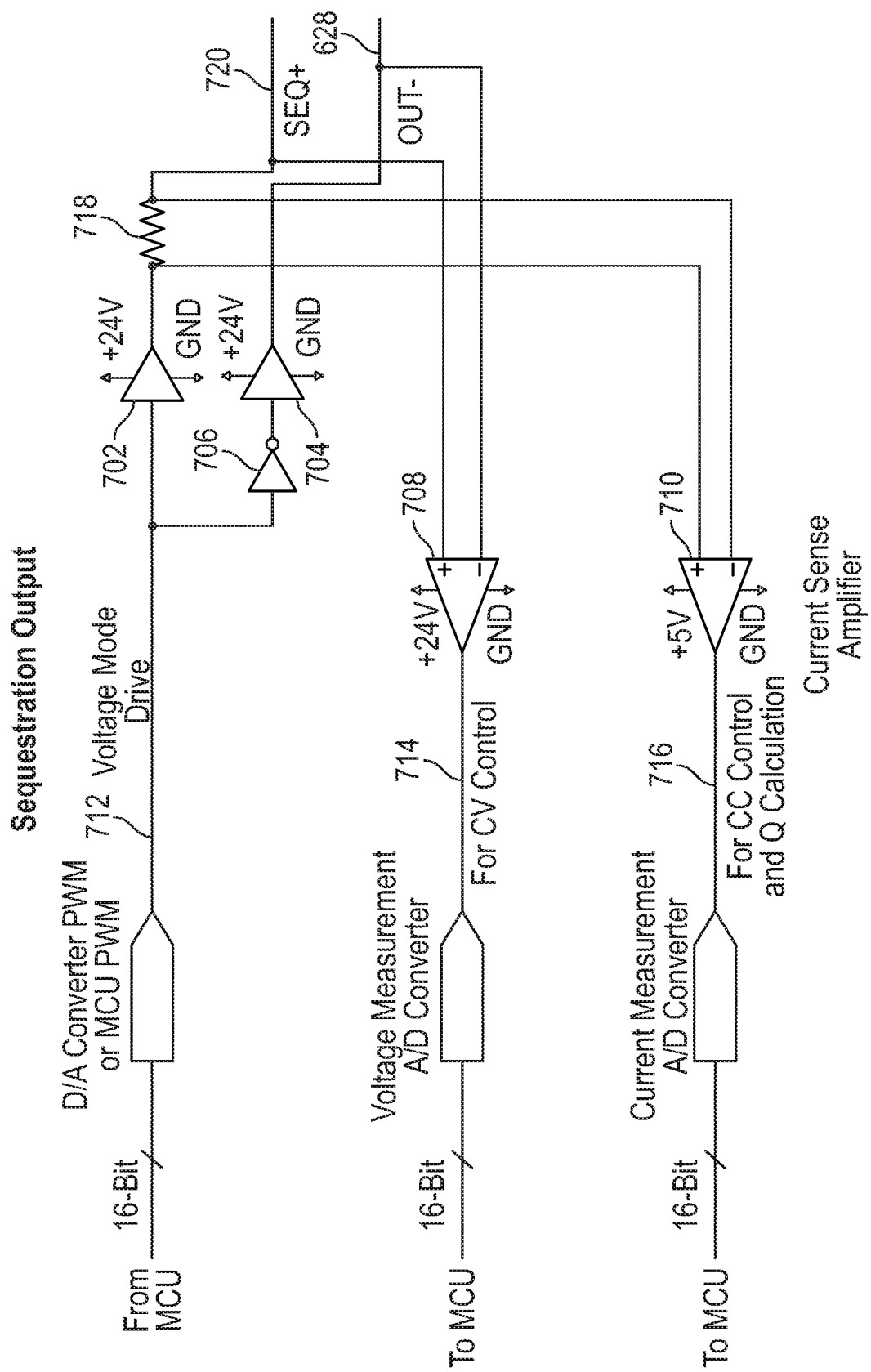
FIG. 9 is a circuit diagram of a further power supply and voltage sensing circuit, which are suitable for use in the driver of FIG. 3 to sequester charge in the electrochromic device.

It should be appreciated that the embodiment illustrated in FIG. 3 of the driver is not meant to be limiting. For example, the reversible constant current supply 102, the reversible variable voltage supply 104 and the switch 108 could be combined in a single, more complex power supply in some embodiments. This power supply is capable of supplying constant current, variable voltage, and reversing polarity in some embodiments. Alternatively, the reversible constant current supply 102 could be implemented as a single polarity constant current supply, with switches for reversing the polarity. The reversible variable voltage supply 104 could be implemented as a single polarity variable voltage supply, with switches for reversing the polarity. The reversible current supply 102 can also be a reversible variable current supply in some cases. In variations of these embodiments, the reversible constant current supply 102 can be supplied by different power supplies such as by the external power supply or the boost circuit power supply or both the external power supply and the boost circuit power supply, and the reversible variable voltage supply 104 can be supplied by different power supplies such as by the external power supply or the boost circuit power supply or both the external power supply and the boost circuit power supply. The switch 108, or other switches in various embodiments of power supplies, could be implemented using relays, solid-state switches, or modes of operation of one or more power supplies. Further examples of power supplies are illustrated in FIGS. 8 and 9. The voltmeter 112 could be implemented using an analog-to-digital converter in some embodiments. The ammeter 114 could be implemented using a low resistance value resistor and an analog-to-digital converter, a Hall effect sensor, an inductive sensor or other sensor, with or without an analog-to-digital converter, or various further devices for detecting current.

The integrator 116 could be an analog integrator, for example based on an operational amplifier with a capacitor in a feedback loop. In some embodiments, the integrator 116 could include a digital adder or arithmetic logic unit, such as found in digital signal processors. In digital embodiments, the integrator 116 could be implemented as a time-series summation of digitally converted values of the current supplied to the electrochromic device. A digital signal processor, or a microprocessor or a controller could be applied to perform such calculations and may be included in the supply control module 106. For example, a digital signal processor or a microprocessor with on-chip analog-to-digital conversion could implement the current sensing, the voltage sensing and the integration, as well as the control algorithms applied to the power supply or supplies. In some embodiments, the analog-to-digital converter could be separate from the digital signal processor or the microprocessor. Various further combinations of analog circuitry, digital circuitry, state machines and/or software programming, discrete components, system-on-chip, etc. are readily devised in keeping with the teachings disclosed herein.

FIG. 4 is a process diagram depicting operation of the driver 100 of FIG. 3 in accordance with some embodiments. The process diagram of FIG. 4 assumes the driver 100 has determined to change the transmissivity of the electrochromic device. Such determination could be a result of a user selection, a schedule, a detection, a rule-based process, an artificial intelligence learning process of the driver 100, etc. To initiate changing the transmissivity of the electrochromic device, the driver 100 performs a charge/discharge to Qtarget process 202. In process 202, the driver 100 charges the electrochromic device towards a desired transmissivity, or discharges the electrochromic device towards a desired transmissivity. This process transfers charge to the electrochromic device. A target amount of charge (i.e., Qtarget) to have in the electrochromic device is determined, based on a targeted transmissivity of the electrochromic device. The target amount of charge to be transferred is determined based on a difference between a present amount of charge in the electrochromic device and the target amount of charge to have in the electrochromic device in some embodiments. The driver 100 monitors the amount of charge being transferred to the electrochromic device, using the charge determination mechanisms described above (e.g., the integrator). When the amount of charge transferred to the electrochromic device equals the target amount of charge to be transferred, the driver 100 terminates the charge/discharge to Qtarget process 202, and starts the four wire open circuit voltage (4 W OCV) process 204. In further embodiments, a three wire process, or a process using more than four wires, can be used. The total number of wires in the interface between the driver 100 and the electrochromic device 118 includes the two wires supplying charge to the bus bars 120 and one, two, or more sense voltage lines, for measuring sense voltage of the electrochromic device 118.

In the four wire open circuit voltage process 204, the driver 100 measures the open circuit voltage across the sense voltage terminals 124, 126 of the electrochromic device 118 (see FIG. 3). In further embodiments, the driver 100 measures the open circuit voltage from one sense voltage terminal 124, 126, 128, 130, 132, 134 to one bus bar 120, or across other pairs of sense voltage terminals 124, 126, 128, 130, 132, 134. The driver 100 then performs the check state of charge (Check SOC) process 206. In the check state of charge process 206, the driver 100 determines a state of charge of the electrochromic device, based on the measured open circuit voltage across the sense voltage terminals, i.e. the sense voltage. The sense voltage relaxes over time after the charging or discharging ceases. Relaxation time, and relaxation amount of voltage can be established through characterization of the electrochromic device, simulation or other techniques. Satisfactory deviation voltage from a relaxed sense voltage can also be determined similarly. The check state of charge process 206 determines whether the state of charge is equal to a target state of charge, based on the above parameters. For example, if the sense voltage, after a relaxation time, and after relaxing by a relaxation amount of voltage, remains within the satisfactory deviation voltage from the relaxed sense voltage, the driver 100 determines that the state of charge of the electrochromic device equals the target state of charge. The process flow would then loop between the four wire open circuit voltage process 204 and the check state of charge process 206. If the sense voltage does not remain within the satisfactory deviation voltage from the relaxed sense voltage, the driver 100 determines that the state of charge of the electrochromic device does not equal the target state of charge. The process flow would then proceed to the charge/discharge to Qtarget process 202, in order to bring the state of charge of the electrochromic device to the target state of charge of the electrochromic device.

FIG. 5 is a process diagram depicting further operation of the driver 100 of FIG. 3 in accordance with some embodiments. The process diagram of FIG. 5 assumes the driver 100 has determined to completely charge or discharge the electrochromic device to a sense voltage of zero volts, to attain maximum transmissivity of the electrochromic device (or minimum transmissivity, for some embodiments of an electrochromic device). This could occur for similar reasons or circumstances as the invocation of the process diagram of FIG. 4. In this state, it is also possible to re-zero the driver 100 as to the state of charge of the electrochromic device. At full discharge of the electrochromic device, the state of charge of the electrochromic device is considered nominally at zero, in some embodiments. It should be appreciated that the calculation and tracking of the state of charge of the electrochromic device through the driver 100 is subject to cumulative small errors as a result of measurement accuracy, noise, drift, leakage, aging of components, etc., and that re-zeroing of the driver 100 can restore accuracy of the tracking of the state of charge of the electrochromic device.

Still referring to FIG. 5, to initiate changing the transmissivity of the electrochromic device to maximum transmissivity (or minimum transmissivity, for some embodiments of an electrochromic device), the driver 100 performs a charge/discharge to a sense voltage of zero volts (Vsns=0V) in process 302. In some embodiments, this corresponds to discharging the electrochromic device to Qtarget=0, i.e., a nominal zero state of charge in the electrochromic device. In some embodiments, this is accomplished by determining an amount of charge to be transferred to the electrochromic device, monitoring the amount of charge transferred to the electrochromic device, and stopping the transfer of charge when the amount of charge transferred to the electrochromic device equals the target amount of charge to be transferred. In other cases, the transfer of charge is stopped after a set time duration elapses. The four wire open circuit voltage process 204 (or variation thereof, as mentioned above) measures the sense voltage, and the check state of charge process 206 determines whether the state of charge is equal to the target amount of charge in the electrochromic device. In this situation, the target is zero, which should correspond to a zero state of charge. If the state of charge matches the target state of charge, the process flow loops between the four wire open circuit voltage process 204 and the check state of charge process 206. If the state of charge does not match the target state of charge, then in some cases, process 304 is initiated where the charge is moved to SEQ (i.e., the charge sequestration terminal 122). If the state of charge does not match the target state of charge, then in some other cases, the charge counter is re-zeroed, and then process 304 is initiated where the charge is moved to SEQ (i.e., the charge sequestration terminal 122). If the state of charge does not match the target state of charge, then in some other cases, process 304 is initiated where the charge is moved to SEQ (i.e., the charge sequestration terminal 122), and then the charge counter is re-zeroed. Upon completion, flow branches back to the check state of charge process 206.

In another set of embodiments, the charge counter can be re-zeroed and/or charge can be moved to SEQ when the charge does match the target state of charge. If the state of charge does match the target state of charge, then in some cases, process 304 is initiated where the charge is moved to SEQ (i.e., the charge sequestration terminal 122). If the state of charge does match the target state of charge, then in some other cases, the charge counter is re-zeroed, and then process 304 is initiated where the charge is moved to SEQ (i.e., the charge sequestration terminal 122). If the state of charge does match the target state of charge, then in some other cases, process 304 is initiated where the charge is moved to SEQ (i.e., the charge sequestration terminal 122), and then the charge counter is re-zeroed.

It should also be appreciated that, in the process depicted in FIG. 5, for some materials/devices, Vsns could be set to −0.5V or Vsns can be set to 0.5V in some embodiments to run the protocol described herein. Other ranges may be utilized with the embodiments, as the protocol described herein for setting Vsns to check the state of the charge of the device is one example and not meant to be limiting.

In sequestration process 304 where the charge is moved to SEQ, charge is moved from one of the bus bars 120 to the charge sequestration terminal 122 (SEQ) of the electrochromic device. This could be performed by coupling one of the bus bars 120 (e.g., an anode or a cathode) of the electrochromic device to one of the output terminals of the driver 100 and coupling the charge sequestration terminal 122 of the electrochromic device to another one of the output terminals of the driver 100. The driver 100 would then be operated so as to charge or discharge the charge sequestration terminal 122 of the electrochromic device relative to the selected one of the bus bars. This operation sequesters charge and/or regenerates the zero state of charge in the electrochromic device, by transferring charge from a main portion of the electrochromic device to a secondary sequestration portion of the electrochromic device, which is accessed via the charge sequestration terminal 122.

Figure 6:
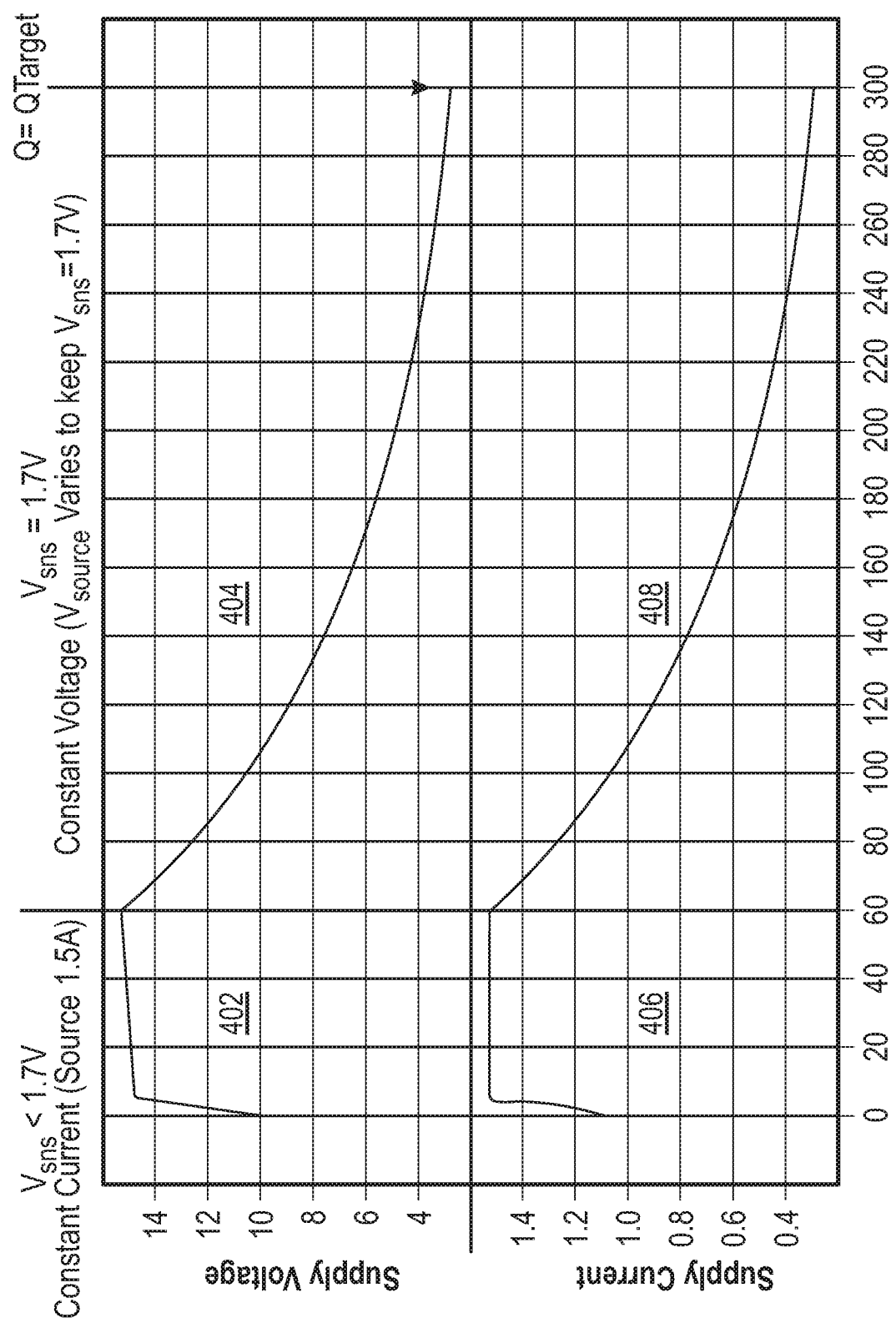
FIG. 6 is a voltage and current versus time graph depicting charging the electrochromic device with the driver of FIG. 3.

FIG. 6 is a voltage (in volts) and current (in amps) versus time graph depicting charging the electrochromic device with the driver 100 of FIG. 3 in some embodiments. Four regions 402, 404, 406, 408 are shown in the graph. Two of the regions 402, 404 depict supply voltage versus time, and two of the regions 406, 408 depict supply current versus time. The horizontal axis is in seconds of time. The example is for a specific electrochromic device, e.g. a window, and may differ for other electrochromic devices and various dimensions of variations of the electrochromic device. Illustrated in the graph of FIG. 6, there is an initial, upward spike in both supply voltage and supply current, from time T=zero, for the first few seconds of operation. In the region 406, constant current is applied up until about sixty seconds of time. The voltage rises slightly, from about 14½ V (volts) to about 15 V during this time, as seen in the region 402. In the constant current region 402, 406, the sense voltage is less than a target sense voltage of 1.7 V, and the constant current source provides about 1½ A (amps) to the electrochromic device 118.

Continuing with FIG. 6, at time T=sixty seconds, the sense voltage reaches the target sense voltage of 1.7 V, and the driver 100 switches from constant current to a variable voltage or a variable current to maintain the sense voltage at 1.7 V. In the region 404, the supply voltage is observed to drop from about 15 V down to about 3 V over the next four minutes (e.g., from sixty seconds to three hundred seconds), as the sense voltage is maintained at a constant voltage equal to the target sense voltage. In the region 408, the supply current is observed to drop from about 1.5 A down to about 0.2 A (i.e., about 1½ A down to about ⅕ A), again while maintaining the sense voltage at a constant voltage. The sense voltage can be maintained at the target sense voltage by controlling a variable voltage applied to the bus bars of the electrochromic device in some embodiments. Alternatively, the sense voltage can be maintained at the target sense voltage by controlling a variable current applied to the bus bars of the electrochromic device. At time T=three hundred seconds, the right end of the graph, the charge in the electrochromic device has reached the target charge Qtarget, and the driver 100 stops supplying the variable voltage (or the variable current) to the electrochromic device. In other words, the driver 100 ceases supplying voltage and current to the electrochromic device. The four wire open circuit voltage process 204 and the check state of charge process 206 can then take place (see FIGS. 4 and 5). In other cases, the transfer of charge can be stopped after a set time duration elapses.

Figure 7:
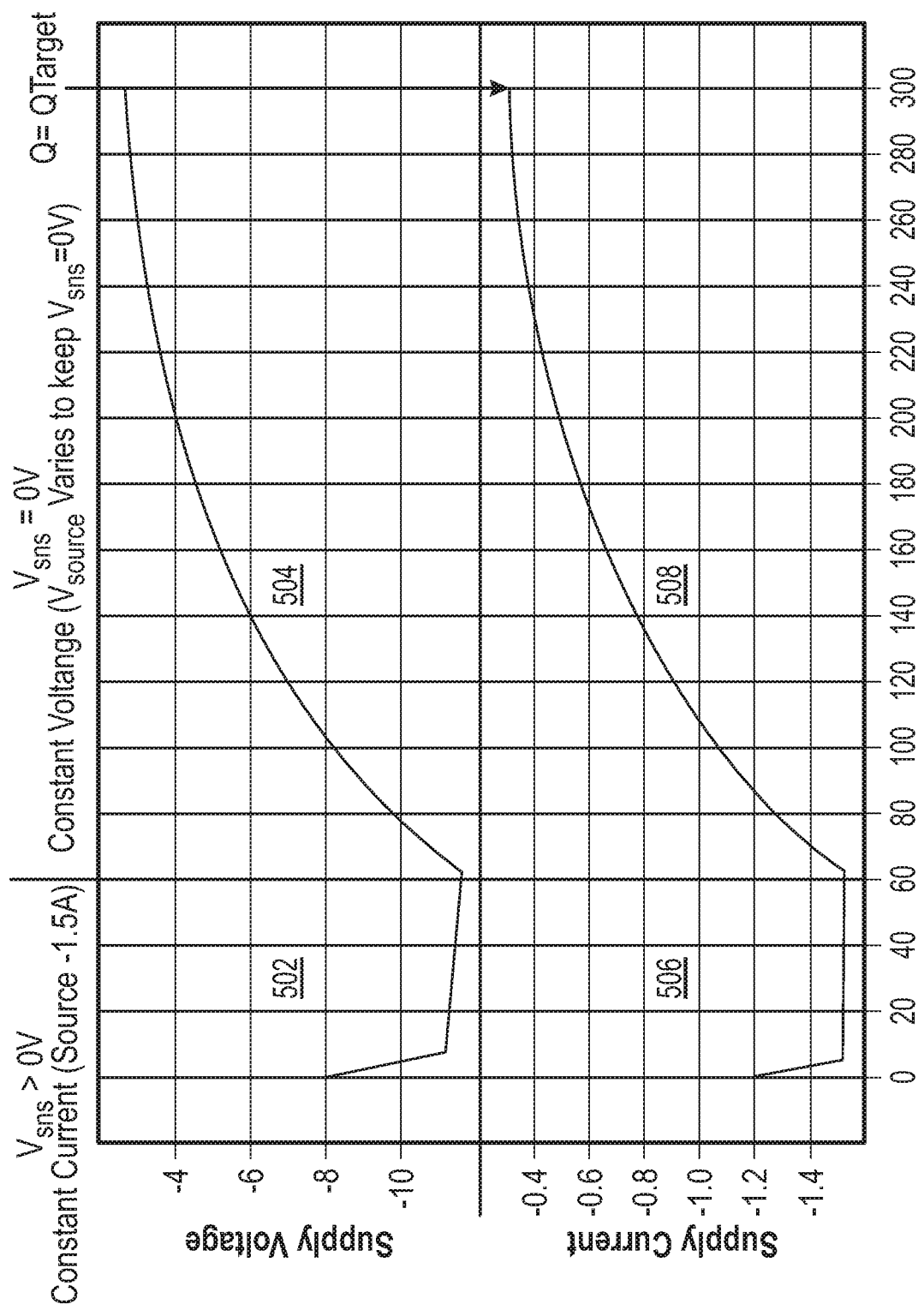
FIG. 7 is a voltage and current versus time graph depicting discharging the electrochromic device with the driver of FIG. 3.

FIG. 7 is a voltage (in volts) and current (in amps) versus time (in seconds) graph depicting discharging the electrochromic device with the driver 100 of FIG. 3 in some embodiments. The graph of FIG. 7 appears inverted as compared to the graph of FIG. 6, and the voltages and currents are negative, i.e., opposite polarity as compared to those of FIG. 6. Otherwise, operation in this mode is similar as described with reference to FIG. 6. There is an initial, downward (i.e., negative) spike in both supply voltage and supply current, from time T=zero, for the first few seconds of operation. In the region 506, constant current is applied up until about sixty seconds of time. The voltage falls slightly (i.e., magnitude increases slightly in a negative direction), from about −11 V to about −11½ V during this time, as seen in the region 502. In the constant current region 506, 502, the sense voltage is greater than a target sense voltage of 0 V, and the constant current source provides about −1½ A (amps) to the electrochromic device.

At time T=sixty seconds in FIG. 7, the sense voltage reaches the target sense voltage of 0 V, and the driver 100 switches from constant current to a variable voltage (or a variable current) to maintain the sense voltage at 0 V. In the region 504, the supply voltage is observed to increase from about −11½ V up to about −2½ V (decreasing in magnitude) over the next four minutes (e.g., from sixty seconds to three hundred seconds), as the sense voltage is maintained at a constant voltage equal to the target sense voltage (i.e., 0 V). In the region 508, the supply current is observed to increase from about −1.5 A up to about −0.2 A or −0.3 A (i.e., about −1½ A up to about −¼ A, a decrease in magnitude), again while maintaining the sense voltage at a constant voltage (of 0 V). At time T=three hundred seconds, the right end of the graph, the charge in the electrochromic device has reached the target charge Qtarget, and the driver 100 stops supplying the variable voltage (or the variable current) to the electrochromic device, i.e., the driver 100 stops supplying current or voltage to the electrochromic device. The four wire open circuit voltage process 204 and the check state of charge process 206 can then take place as described with reference to FIGS. 4 and 5. In other cases, the transfer of charge can be stopped after a set time duration elapses.

The graphs shown in FIGS. 6 and 7 apply to full charge and full discharge of the electrochromic device, respectively. Full charge achieves minimum transmissivity of the electrochromic device, and full discharge achieves maximum transmissivity of the electrochromic device in some embodiments. Partial charge or partial discharge of the electrochromic device achieves various intermediate amounts of transmissivity of the electrochromic device, and may have differing values of target charge and sense voltage, accordingly.

One example of a charge/discharge protocol for the electrochromic device is shown in Table 1 below, similarly to the actions shown in FIGS. 6 and 7. This protocol can be practiced using the system shown in FIG. 3, the processes shown in FIGS. 4 and 5, and in methods discussed below.

TABLE 1

Use CCCV (constant current-constant sense voltage) sourcing with 4W sensing
Full Charge/Partial Charge/Partial Discharge:
Apply constant supply current
Measure sense voltage and supply current (count charge)
Stop step when Qsource = Qtarget
IF
sense voltage reaches Vlimit
THEN
switch to constant voltage mode.
Hold Vsns = Vlimit until Qsource = Qtarget.
Full Discharge:
Apply constant supply current
Measure sense voltage and supply current (count charge)

TABLE 1-continued

IF
sense voltage reaches 0 V
THEN
switch to constant voltage mode.
Hold Vsns = Vlimit until Qsource = Qtarget.

The above protocol applies a non-zero sense voltage limit for full charge, partial charge, and partial discharge, and a 0 V sense voltage limit for full discharge. In the full charge, partial charge and partial discharge, the constant supply current is stopped when the total amount of charge transferred to the electrochromic device reaches the target amount of charge to be in the electrochromic device, or when the sense voltage reaches the sense voltage limit, whichever comes first. If the sense voltage is reached, but the target amount of charge is not yet reached, the constant voltage mode applies a variable voltage to the electrochromic device and holds the sense voltage at the sense voltage limit (i.e., the constant voltage) until the target amount of charge is reached in the electrochromic device. In other cases, the constant current, variable voltage, and/or transfer of charge is stopped after a set time duration elapses. In another example, where the device is set to fully discharge, the sense voltage limit is 0 V, and this is held for a total of five minutes (or some other predetermined time span) while the variable voltage is applied. Constant current (to the electrochromic device) and constant voltage (of the sense voltage) are used, with four wire sensing in some embodiments. That is, there are four wires to the electrochromic device, two of which (attached to the bus bars) are used for supplying current and voltage, and two of which (attached to the sense voltage terminals) are used for the sense voltage. In full charge, partial charge, partial discharge, and full discharge, charge is counted by measuring the supply current (which is integrated over time, or discreetly summed as a digital approximation of an integral over time). The charge count is related to how much charge (i.e., electrons) is transferred to the electrochromic device over time through one of the bus bars, and is applied to the determination of whether the total amount of charge transferred to the electrochromic device has reached a target amount of charge. In other cases, the transfer of charge is stopped after a set time duration elapses. The term "constant current—constant voltage" sourcing, refers to having two stages or phases applied to rapid transmissivity change, namely a first stage of applying constant current to the electrochromic device 118, and a second stage of maintaining constant sense voltage of the electrochromic device 118.

FIG. 8 is a circuit diagram of a power supply and voltage sensing circuit, which are suitable for use in the driver 100 of FIG. 3 to charge and discharge the electrochromic device in some embodiments. The circuit applies pulse width modulation (PWM) from a microcontroller unit (MCU) to drive high output buffers 602, 604, which supply power (i.e., voltage and current) to the electrochromic device. Voltage across selected terminals of the electrochromic device is input to various differential amplifiers 606, 608, 610, the outputs of which are sent to an analog-to-digital converter of the microcontroller unit. Gains of the differential amplifiers 606, 608, 610 could be unity gains. Alternatively, a gain and/or an offset could be selected in order to match with a range of the analog-to-digital converter inputs. A pulse width modulation output 612 from the microcontroller unit is an input to a first non-inverting buffer 602, and is an input to an inverter 630, the output of which drives a second non-inverting buffer 604. The output of the first non-inverting buffer 602 connects to a first terminal of a resistor 620, and the second terminal of the resistor 620 connects to the VSOURCE+ terminal 622 of the power supply. The VSOURCE+ terminal 622 can be connected to the VSOURCE+ terminal (e.g., one of the bus bars 120) of the electrochromic device 118 depicted in FIG. 3.

Continuing with FIG. 8, the output of the second non-inverting buffer 604 connects to the VSOURCE− terminal 628 of the power supply. The VSOURCE− terminal 628 can be connected to the VSOURCE− terminal (e.g., another one of the bus bars 120) of the electrochromic device 118 of FIG. 3. Applying a pulse width modulation signal as the pulse width modulation output 612 from the microcontroller unit results in the first non-inverting buffer 602 and the second non-inverting buffer 604 producing complementary rail to rail outputs of a controlled pulse width. In some embodiments, the large amount of capacitance of the electrochromic device reduces the amplitude of the modulated outputs of the first non-inverting buffer 602 and the second non-inverting buffer 604, so that a DC voltage of a controllable amplitude and polarity is produced across the bus bars of the electrochromic device. The voltage may have some voltage ripple in some embodiments. The use of pulse width modulation to produce a DC voltage may be related to how pulse width modulation is applied to a capacitive load in switching power supplies.

The VSNS+ terminal 624 of the circuit of FIG. 8 can be connected to the VSNS+ terminal 124 of the electrochromic device 118, and the VSNS− terminal 626 can be connected to the VSNS− terminal 126 of the electrochromic device 118. The voltage across the VSNS+ terminal 624 and the VSNS− terminal 626 is input to the first differential amplifier 606, the output of which is a first analog-to-digital converter input 614. By this path, the analog-to-digital converter can measure the sense voltage of the electrochromic device. Referring back to FIG. 3, this is one embodiment of the voltmeter. Measurement of the sense voltage is applied in the so-called constant voltage control, in which the voltage or current to the electrochromic device is controlled so as to maintain a constant sense voltage. In this embodiment, the duty cycle of the pulse width modulation output 612 is controlled by a microcontroller unit, and varied while monitoring the sense voltage.

The VSOURCE+ terminal 622 and the VSOURCE− terminal 628 of FIG. 8 are connected as inputs to the second differential amplifier 608, the output of which is a second analog-to-digital converter input 616. By this path, the analog-to-digital converter can measure the voltage across the bus bars of the electrochromic device, and determine the voltage applied to the electrochromic device. This information can be used by the microcontroller to monitor the voltage that is applied across the bus bars 120 of the electrochromic device 118 of FIG. 3. In one embodiment, the microcontroller monitors the voltage and adjusts the pulse width modulation as described above to provide the constant current supply, the variable voltage supply and/or the variable current supply, with the selected polarity. The voltage (i.e., electrical potential) between the VSOURCE+ and VSOURCE− terminals, or between the VSOURCE+ and another terminal, or between the VSOURCE− and another terminal, can also have voltage limits. Similarly to the Vsns voltage limits, if one of these VSOURCE voltage limits are reached during the application of a constant current, then a variable current mode can be initiated to maintain the VSOURCE voltage at, or below, the voltage limit.

Opposed terminals of the resistor 620 of FIG. 8 are connected as inputs to a third differential amplifier 610, the output of which is a third analog-to-digital converter input 618. By this path, the analog-to-digital converter can measure voltage across the resistor 620. With the value of the resistor 620 and the voltage across the resistor 620, the microcontroller unit can calculate the current through the resistor 620, which is also the current into the electrochromic device. Referring back to FIG. 3, this is one embodiment of the ammeter. The microcontroller can thus monitor the current as to both magnitude and polarity, and adjust the pulse width modulation as described above. The value of the current can also be used for calculating the total amount of charge that has been transferred into the electrochromic device, for example by repeatedly summing digitally converted values of the current over a span of time, in some embodiments.

FIG. 9 is a circuit diagram of a further power supply and voltage sensing circuit, which are suitable for use in the driver 100 of FIG. 3 to sequester charge in the electrochromic device in some embodiments. The circuitry is similar in principle and operation to that shown in FIG. 8, but with connections appropriate to charge sequestration. In FIG. 9, a further pulse width modulation output 712 from the microcontroller unit is an input to a third non-inverting buffer 702, and is an input to a further inverter 706, the output of which drives a fourth non-inverting buffer 704. The output of the third non-inverting buffer 702 connects to a first terminal of a resistor 718, and the second terminal of the resistor 718 connects to the SEQ+ terminal 720 of the power supply. The SEQ+ terminal 720 can be connected to the charge sequestration terminal 122 (labeled SEQ in FIG. 3) of the electrochromic device 118.

The output of the fourth non-inverting buffer 704 of FIG. 9 connects to the VSOURCE− terminal 628 of the power supply. The VSOURCE− terminal 628 can be connected to the VSOURCE− terminal (e.g., one of the bus bars 120) of the electrochromic device 118 of FIG. 3. Applying a pulse width modulation signal as the pulse width modulation output 712 from the microcontroller unit results in the third non-inverting buffer 702 and the fourth non-inverting buffer 704 producing complementary rail to rail outputs of a controlled pulse width. As similarly described above, this produces a DC voltage of a controllable amplitude and polarity, which may have some ripple voltage, across the charge sequestration terminal 122 and one of the bus bars 120 of the electrochromic device 118 of FIG. 3. In various further embodiments, the output of the fourth non-inverting buffer 704 can be connected to the VSOURCE+ terminal of the electrochromic device. In the above embodiments, the power supply depicted in FIG. 9 can transfer charge between the selected bus bar 120 of the electrochromic device 118 and the charge sequestration terminal 122, which sequesters charge from the electrochromic device 118 of FIG. 3.

Still referring to FIG. 9, the SEQ+ terminal 720 and the VSOURCE− terminal 628 are connected as inputs to the fourth differential amplifier 708, the output of which is a fourth analog-to-digital converter input 714. By this path, the analog-to-digital converter can measure the voltage across the charge sequestration terminal 122 and the selected one of the bus bars 120 of the electrochromic device 118 of FIG. 3, and determine the voltage applied for charge sequestration. In one embodiment, the microcontroller monitors the voltage thusly, and adjusts the pulse width modulation as described above to provide a constant current supply, a variable voltage supply and/or a variable current supply, with a selected polarity. Opposed terminals of the resistor 718 are connected as inputs to a fifth differential amplifier 710, the output of which is a fifth analog-to-digital converter input 716. By this path, the analog-to-digital converter can measure voltage across the resistor 718. With the values of the resistor 718 and the voltage across the resistor 718, the microcontroller unit can calculate the current through the resistor 718, which is also the current into the charge sequestration terminal 122 of the electrochromic device 118 of FIG. 3. The microcontroller is able to monitor this current as to both magnitude and polarity, and adjust the pulse width modulation as described above. The value of the current can also be used for calculating the total amount of charge that has been transferred for sequestration, for example by repeatedly summing values of the current in some embodiments. The voltage (i.e., electrical potential) between the SEQ+ terminal and VSOURCE− or another terminal, can also have voltage limits. Similarly to the Vsns voltage limits, if one of these SEQ voltage limits are reached during the application of a constants sequestration current, then a variable current mode can be initiated to maintain the SEQ voltage at, or below, the voltage limit.

Figure 10A:
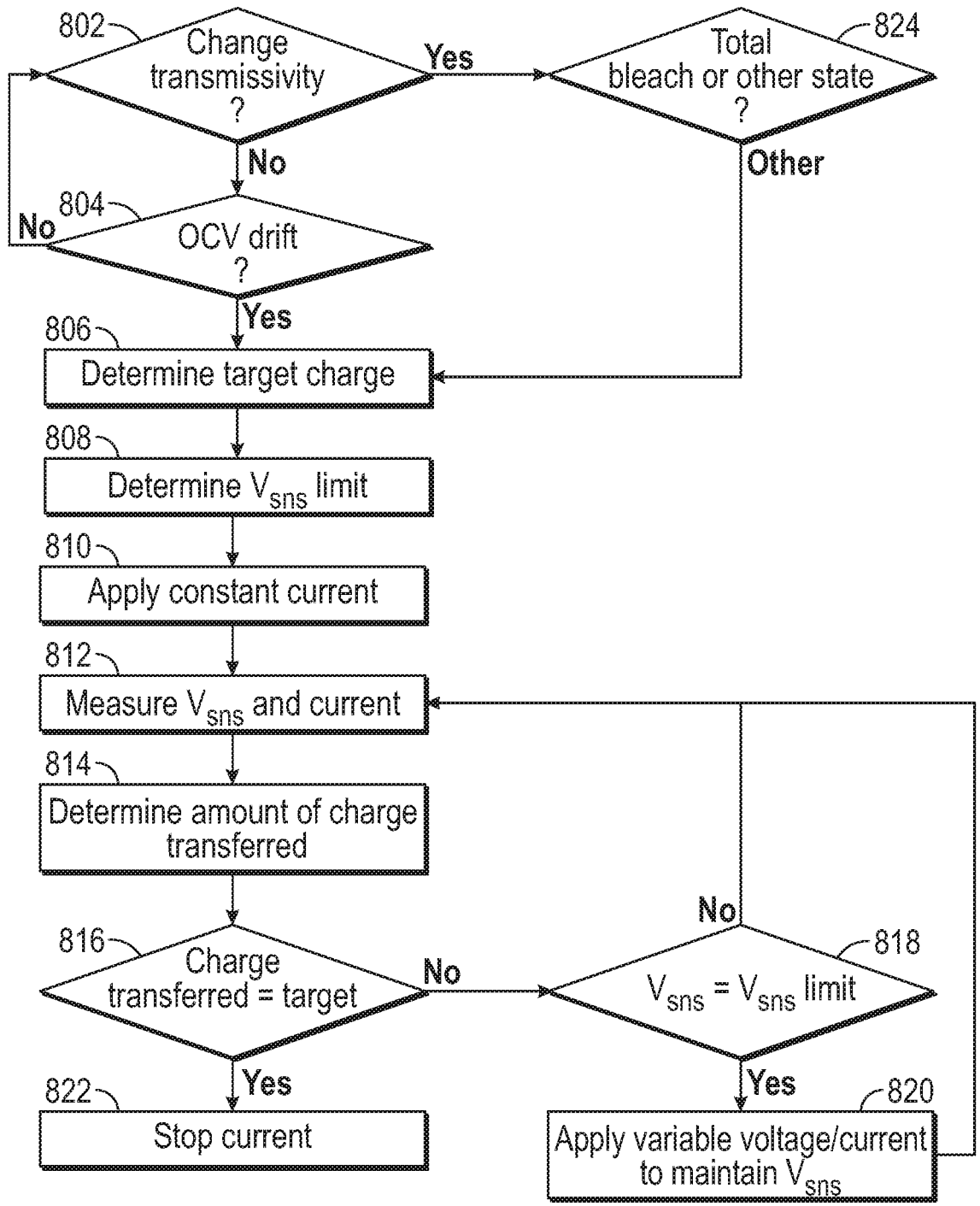
FIG. 10A is a flow diagram of a method for controlling an electrochromic device, which can be practiced using the system of FIG. 3.
Figure 10B:
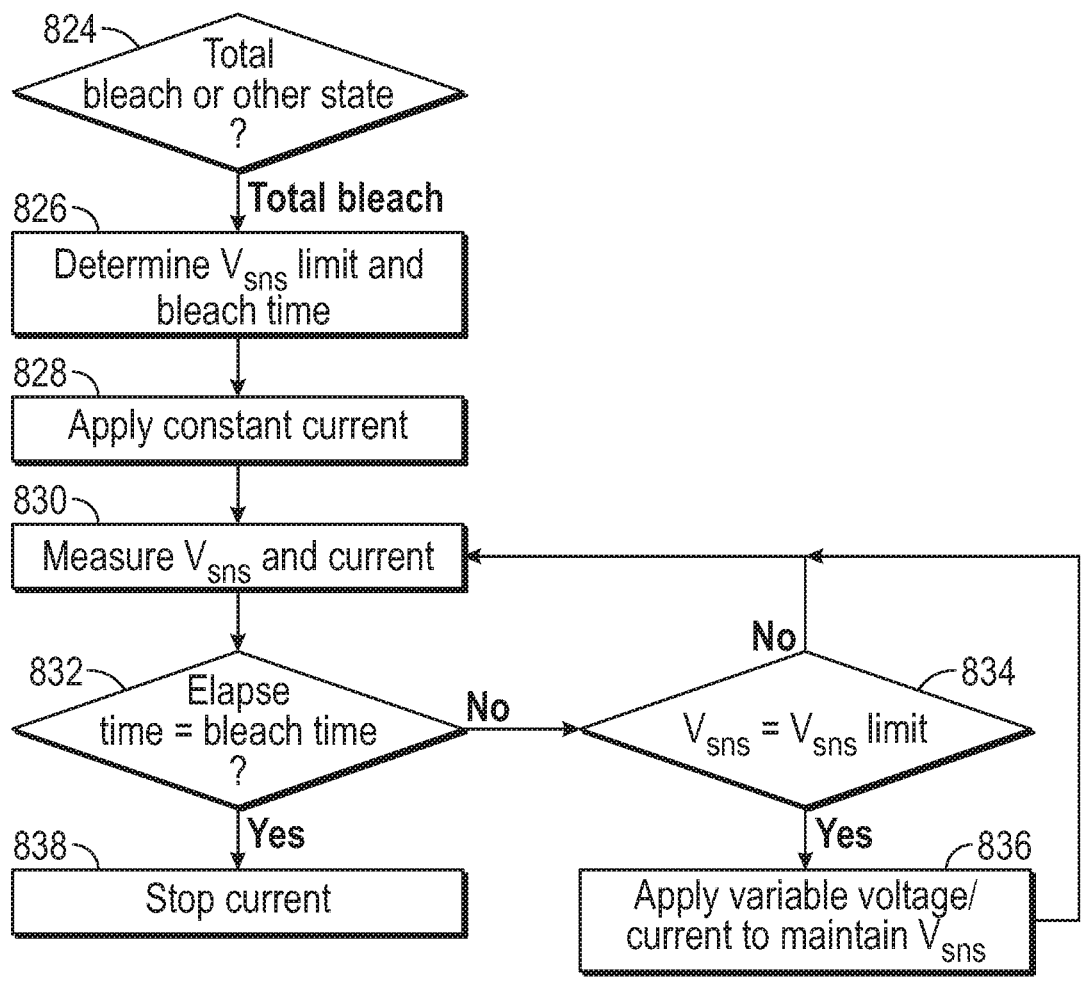
FIG. 10B is a flow diagram of a method for controlling an electrochromic device, which can be practiced using the system of FIG. 3.
Figure 10C:
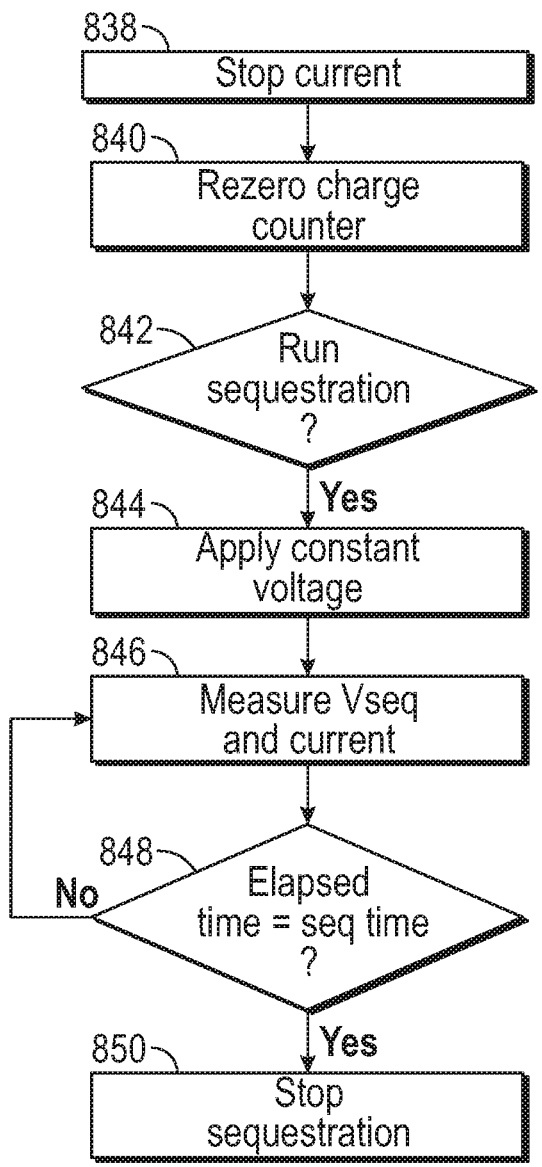
FIG. 10C is a flow diagram of a method for controlling sequestration of an electrochromic device, which can be practiced using the system of FIG. 3.

FIGS. 10A, 10B, and 10C are flow diagrams of a method for controlling an electrochromic device, which can be practiced using the system of FIG. 3 in some embodiments. More specifically, the method can be practiced on or by the driver or the supply control module of FIG. 3, or by a processor such as a microprocessor or a digital signal processor in a control system. In a decision action 802, it is determined whether to change the transmissivity of an electrochromic device. This determination could be based on user input, user schedule, sensor input, rules, artificial intelligence, etc. If the answer is yes, i.e., to change the transmissivity, flow proceeds to the action 824, and if the answer is no, i.e., to not change the transmissivity, flow proceeds to the decision action 804.

In decision action 804, it is determined whether there is open circuit voltage drift in the electrochromic device. For example, while waiting for indication from a user or a user device, a controller or driver could be checking open circuit voltage across sense voltage terminals of the electrochromic device to determine if the open circuit voltage changes beyond an acceptable amount of drift over time. If the answer is no, there is no drift (i.e., the amount of drift is within an acceptable range), flow branches back to the decision action 802. The controller or driver can loop through the decision actions 802, 804, looking for a decision or reason to change the transmissivity of the electrochromic device. If the answer is yes in decision action 804, there is drift, flow branches to the action 806.

In decision action 824, it is determined if the transmissivity change will be to the total bleach state, or to another state, such as darkened or an intermediate state. If the answer to decision action 824 is to change the transmissivity to a state other than a total bleach state, then the flow also branches to action 806.

Action 806 of FIG. 10A is entered when there is a decision to change the transmissivity of the electrochromic device, whether this is deliberate on behalf of a user, or due to drift. In action 806, a target charge to be transferred to the electrochromic device is determined. The target charge can be based on the tracked total amount of charge transferred to the electrochromic device and a difference between a tracked transmissivity level and a desired transmissivity level of the electrochromic device, in the case of an action performed on behalf of a user in some embodiments. Alternatively, the target charge is based on restoring the originally targeted total amount of charge on the electrochromic device in the case of drift. A sense voltage limit is determined, in action 808. The sense voltage limit is greater than 0 V in magnitude, and of appropriate polarity relative to terminals of the electrochromic device, in the case of charging the electrochromic device to decrease transmissivity. The sense voltage limit is 0 V, in the case of fully discharging the electrochromic device, which is in some embodiments to maximum transmissivity. The sense voltage limit is intermediate in the case of partial charge or partial discharge. Further, the sense voltage limit is set at a safe value, e.g., according to a table, a parameter or a calculation, so as to protect the electrochromic device from deterioration as a result of too much current or voltage. The actions 806 and 808 can be performed in either order, in various embodiments.

Still referring to FIG. 10A, constant supply current is applied to the electrochromic device, in an action 810. The appropriate polarity for the current should be selected, according to whether the electrochromic device is being charged or discharged. The sense voltage and the supply current are measured, in an action 812. For example, the sense voltage can be measured across sense voltage terminals of the electrochromic device, using analog-to-digital conversion. The supply current can be measured by measuring the voltage across an in-line resistor coupled to one of the bus bars of the electrochromic device.

Following action 812, the amount of charge transferred to the electrochromic device is determined in an action 814. The charge transferred to the electrochromic device can be determined by integrating the current supply to the electrochromic device over time in various embodiments. Analog or digital integration techniques can be applied. In a decision action 816 of FIG. 10A, it is determined whether the charge transferred to the electrochromic device equals the target amount of charge to be transferred. If the answer is yes, the charge transferred equals the amount of charge to be transferred, i.e., the target amount of charge has been transferred, then the flow branches to the action 822 and the current (and the voltage) application to the electrochromic device is stopped. Flow then proceeds back to the decision action 802, in order to loop while waiting for a determination to charge or discharge the electrochromic device, and check for drift.

If the answer in decision action 816 is no, flow branches to decision action 818, where it is determined whether the sense voltage reaches the sense voltage limit. For example, the sense voltage has not yet reached the sense voltage limit if the sense voltage is less than an upper sense voltage limit in the case of charging, or the sense voltage is greater than a lower sense voltage limit in the case of discharging. If the sense voltage has not yet reached the sense voltage limit, the answer to the decision action 818 is no, and flow branches to the action 812, in order to continue looping, measuring the sense voltage and the supply current and determining whether the total amount of charge has yet been transferred. If the sense voltage has reached the sense voltage limit, the answer to the decision action 818 is yes, and flow branches to the action 820.

In the action 820 of FIG. 10A, the constant current 810 is stopped, and a variable voltage or a variable current is supplied to the bus bars of the electrochromic device, to maintain the sense voltage (at the sense voltage terminals of the electrochromic device) at the sense voltage limit. This involves ceasing the constant current, and changing to the variable operation of the power supply or power supplies. For example, the voltage or the current of a power supply or power supplies is adjusted while the sense voltage is monitored, and adjustments are made accordingly, e.g., by a driver or a controller such as the supply control module of FIG. 3. As a further example, the pulse width modulation applied by a microcontroller to the output buffers in the power supply and voltage sensing circuit of FIG. 8 is adjusted by the microcontroller, to maintain a constant sense voltage. The process then returns to action 812, where the sense voltage and current are monitored, 814, where the amount of charge transferred is determined, and to the decision action 816. Once the charge transferred equals the target charge, the answer to decision action 816 is yes, and the flow branches to action 822, where the current (and voltage) stops.

In variations of the method, the decision actions 816 and 818 could be split or rearranged or performed at other times during the flow. Various further variations of the method are readily devised in keeping with the teachings herein.

In other variations, the decision action at 816 could be based on an elapsed time rather than a target amount of charge transferred.

Returning to decision action 824, if it is determined that the transmissivity change will be towards a total bleach state, then flow proceeds to the action 826, in FIG. 10B. In action 826, the sense voltage limit is determined, and a bleach time is also determined. The sense voltage limit is 0 V, in the case of fully discharging the electrochromic device, which is in some embodiments to maximum transmissivity. Again, constant supply current is applied to the electrochromic device, in an action 828, and the sense voltage and the supply current are measured, in an action 830. The flow next proceeds to decision action 832, where it is determined if the elapsed time of the constant current application has reached the bleach time determined in action 826. If the elapsed time has not reached the bleach time, then the flow branches to decision action 834. In some cases, the sense voltage will be held at zero volts and the constant current 828 or variable voltage/current 836 will be applied until the elapsed time reaches the predetermined duration.

In the decision action 834 of FIG. 10B, it is determined whether the sense voltage reaches the sense voltage limit. If the sense voltage has not yet reached the sense voltage limit, the answer to the decision action 834 is no, and flow branches to the action 830 in order to continue looping, measuring the sense voltage and the supply current and determining whether the elapsed time has reached the bleach time in decision action 832. If the sense voltage has reached the sense voltage limit, the answer to the decision action 834 is yes, and flow branches to the action 836.

In the action 836 of FIG. 10B, the constant current 828 is stopped, and a variable voltage or a variable current is supplied to the bus bars of the electrochromic device, to maintain the sense voltage (at the sense voltage terminals of the electrochromic device) at the sense voltage limit. This involves ceasing the constant current, and changing to the variable operation of the power supply or power supplies. For example, the voltage or the current of a power supply is adjusted while the sense voltage is monitored, and adjustments are made accordingly, e.g., by a driver or a controller such as the supply control module of FIG. 3. As a further example, the pulse width modulation applied by a microcontroller to the output buffers in the power supply and voltage sensing circuit of FIG. 8 is adjusted by the microcontroller, to maintain a constant sense voltage. The process then branches back to action 830, where the sense voltage and current are monitored, and decision action 832.

Once the elapsed time reaches the bleach time, the answer to decision action 832 is yes, and the flow branches to action 838, where the current (and voltage) stops.

In variations of the method, the decision actions 832 and 834 could be split or rearranged or performed at other times during the flow. Various further variations of the method are readily devised in keeping with the teachings herein.

In some cases, the constant current supplied to the device to switch it to the total bleach state will be stopped 838 of FIG. 10B after a trigger other than time duration. For example, the constant current could be stopped after a certain target amount of charge is transferred. Another example criteria for stopping the constant current is a determination that a particular voltage limit is measured. For instance, the constant current could be stopped when the magnitude (i.e. the absolute value) of the sense voltage is less than a certain value, such as less than 1 V, or less than 0.1 V, or less than 0.05 V, or less than 0.01 V.

In some embodiments, the total bleach state corresponds to a fully discharged device, and after action 838 (where the bleach time has elapsed and the current is stopped), the process flow proceeds to action 840 of FIG. 10C where the charge counter is re-zeroed.

In some cases, re-zeroing the charge counter 840 is initiated when the sense voltage is held at zero volts, or when the sense voltage is less than a certain value, such as less than 100 mV, or less than 50 mV, or less than 10 mV, or less than 1 mV, or less than 0.1 mV, or less than 0.01 mV, or less than 0.001 mV.

In some electrochromic devices, it is advantageous to perform sequestration when the device is in the total bleached state. Therefore, in some cases, after the charge counter is re-zeroed, the flow can proceed to decision action 842 of FIG. 10C. In decision action 842, it is determined if sequestration should be run. If the answer is no, then the flow can branch back to decision action 802. If the answer is yes to run sequestration, then the flow proceeds to action 844.

The decision to run sequestration could be based on any number of conditions such as a set time schedule (e.g., once per day), state of the electrochromic device (e.g., total bleach), electrical measurement (e.g., sense voltage magnitude less than a pre-set limit), or any combination of conditions. For instance, the decision to run sequestration could be based on the combination of when the device is in the total bleach state (e.g., after action 838), and if more than 2 hours have elapsed since the previous sequestration cycle. Another example could be after every total bleach cycle is completed (e.g., after action 838). Another example could be every time the sense voltage magnitude is less than 0.1 V, and no other cycle is running (e.g., the answer to 816, 818, 832 or 834 is no).

In other variations of the method, decision action 842 of FIG. 10C can be performed at other times during the flow, such as after 804, 830, or 838, in keeping with the teaching herein.

When sequestration is run, flow proceeds to action 844, where a constant voltage is supplied with the sequestration terminal. For example, a constant voltage can be applied between the sequestration terminal (e.g., 122 in FIG. 3) and one of the bus bars (e.g. 120 in FIG. 3). By way of further example, a constant voltage can be applied between the sequestration terminal (e.g., 720 in FIG. 9) and the VSOURCE− terminal of the power supply (e.g., 628 in FIG. 9). As the constant voltage is being applied, the flow proceeds to action 846, where the sequestration voltage (i.e. Vseq) and the current is monitored.

In decision action 848, it is determined if the constant voltage has been applied for a time duration equal to a pre-set sequestration time. If the elapsed time of the sequestration has not been met, then flow branches back to 846, and the sequestration voltage (i.e. Vseq) and the current continues to be monitored. If the elapsed time of the sequestration has been met, then the flow proceeds to action 850, and the sequestration voltage is stopped. After action 850, flow braches back to 802. In some cases, the sequestration will be stopped after a trigger other than time duration. For example, the constant voltage in action 844 could be stopped after a certain target amount of charge is transferred, or upon the determination that a particular voltage limit is measured.

In other embodiments, the sequestration could be accomplished by applying a constant current to the sequestration terminal rather than a constant voltage, or by applying a variable voltage/current based on a measured current or voltage limit. For instance, a sense voltage terminal could be added to the sequestration element, and that be used to independently monitor the local voltage at different locations within the sequestration element.

Figure 11:
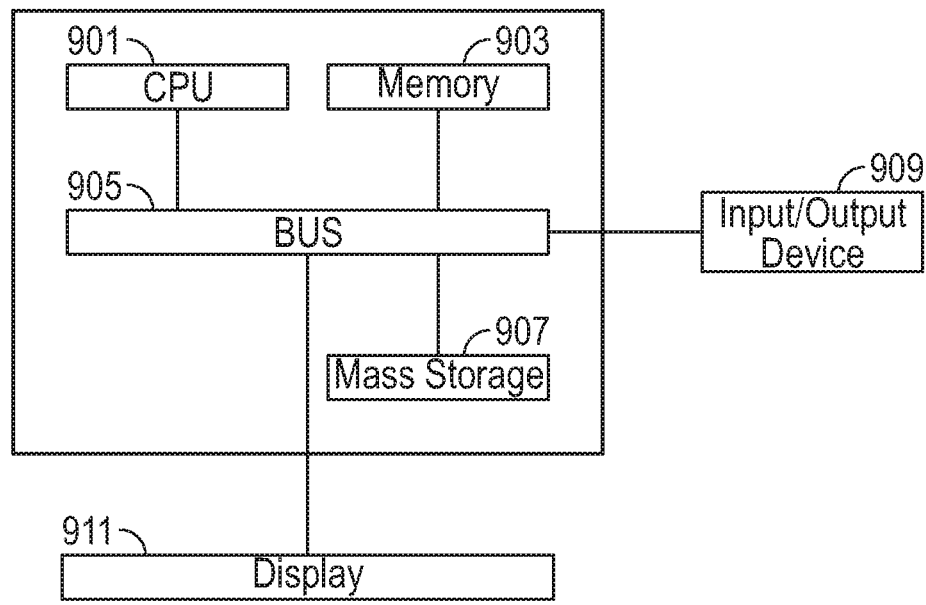
FIG. 11 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 11 is an illustration showing an exemplary computing device which may implement the embodiments described herein. The computing device of FIG. 11 may be used to perform embodiments of the functionality for controlling an electrochromic device in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein, for instance to enable the functionality described with reference to FIGS. 3-10C. The code embodying this functionality may be stored within memory 903 or mass storage device 907 for execution by a processor such as CPU 901 in some embodiments. The operating system on the computing device may be MS-WINDOWS™, UNIX™, LINUX™, iOS™ or other known operating systems, or without an operating system at all. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

Electrochromic Device Embodiments

Figure 12:
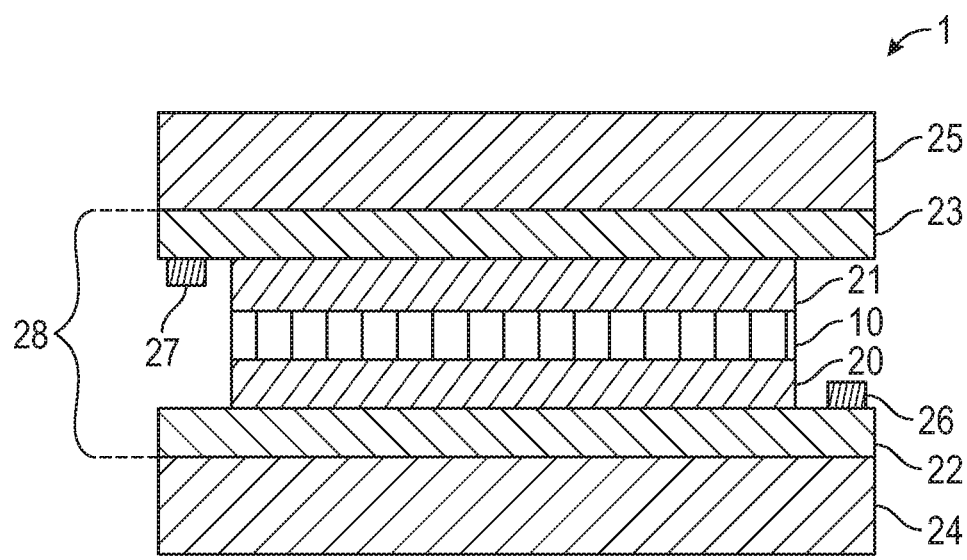
FIG. 12 depicts a cross-sectional structural diagram of electrochromic device 1 according to a first embodiment of the present disclosure.

FIG. 12 depicts a cross-sectional structural diagram of electrochromic device 1 according to a first embodiment of the present disclosure. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against "outer substrates" 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the electrochromic stack 28 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic stack 28 from a more transmissive state to a less transmissive state, or from a less transmissive state to a more transmissive state. In one embodiment, electrochromic stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

In some embodiments, one or both of the electrically conducting layers 22 and 23 are gradient electrically conductive layers. An electrically conductive layer with a "gradient", as defined herein, refers to an electrically conducting layer with spatially varying sheet resistance, or resistance to current flow substantially parallel to a major surface of the layer that varies as a function of position within the electrically conductive layer. In some embodiments, the electrically conducting layers are a gradient based on thickness of the transparent conductive oxide (TCO) material and have an inverse symmetry. In other embodiments, the resistance gradient in the transparent conductive layer may be formed by different techniques such as by creating a gradient in the composition of the transparent conductive layer, or by patterning the materials with a scribe or etchant to effectively create an "electron maze." Regardless of the technique used, the gradients may have an inverse symmetry to one another. The gradient transparent conductive layer allows for the use of EC devices in panels used for large scale applications such as architectural windows or in transportation applications such as buses and trains or automobiles.

This is because with a gradient transparent conductive layer there is not a drop in effective voltage across an EC panel or device once the voltage is applied to the EC panel or device at the bus bars, which provides for a uniform transition between tint states across all dimensions of the EC panel. More details on gradient transparent conductive layers and different embodiments applicable to the EC devices described in this specification can be found in U.S. Pat. No. 8,717,658 entitled EC Multi-Layer Devices With Spatially Coordinated Switching (incorporated herein by reference), U.S. Pat. No. 9,091,895 EC Multi-Layer Devices With Composite Electrically Conductive Layers (incorporated herein by reference), U.S. Pat. No. 9,091,868 EC Multi-Layer Devices With Composite Current Modulating Structure (incorporated herein by reference), and patent application number US 2014/0043668 EC Multi-Layer Devices With Current Modulating Structure (incorporated herein by reference.) The gradient transparent conductive layers can not only remove the "iris effect" problem that larger scale EC devices have by enabling the uniform transition between states across the entire surface of the EC panel, but also enable the fast transition between tint states (i.e., a short switching time, or a fast switching speed) and in particular from the clear state to the dark state and vice versa. Electrochromic devices having the gradient ECL technology work well with the boost circuit technologies described herein because of the fast switching capabilities. The boost circuit power supply can provide additional power to enable very fast switching between transmissivities of electrochromic devices incorporating gradient ECL or TCO layers.

Electrochromic Multi-Layer Stack Cathodes

In one embodiment, the electrochromic materials comprised by the anode electrode (i.e., the first or second electrode 20, 21; see FIG. 12) of a multi-layer stack of the present disclosure are inorganic or organometallic and the electrochromic materials comprised by the cathode (i.e., the other of the first or second electrode 20, 21; see FIG. 12) are independently inorganic or organometallic. More specifically, the electrochromic materials comprised by the anode and/or the cathode are inorganic or organometallic solid state materials with 3-D framework structures comprising metals bridged or separated by anionic atoms or ligands such as oxide, hydroxide, phosphate, cyanide, halide, that further comprise mobile ions such as protons, lithium, sodium, potassium that can intercalate and de-intercalate as the material is reduced or oxidized during the electrochromic cycle.

Oxides of W, Nb, Ta, Ti, V, and Mo color under charge insertion (reduction) and are referred to as cathodic electrochromic materials. Oxides of Ni, Cr, Mn and Ir color upon charge extraction (oxidation) and are anodic electrochromic materials. In one embodiment, cathodically coloring films include oxides based on tungsten, molybdenum, niobium, and titanium.

A variety of cathodically coloring films comprising W, Nb, Ta, Ti, V, and Mo are known in the art and can be prepared by a number of deposition processes including vapor deposition processes, wet-coating processes, spray coating processes, dip coating, and electrodeposition. Many of these cathodic films are mixed metal oxides where lithium or protons are intercalated to balance charge during cycling. Additionally, non-oxide based films such as . . . materials can be useful as cathodic electrochromic films. In one embodiment, cathodically coloring films include oxides, hydroxides and/or oxy-hydrides based on W, Nb, Ta, Ti, V, and Mo.

The electrochromic device with an external power supply and a boost circuit power supply can have a cathode that includes cathodically coloring films include oxides, hydroxides and/or oxy-hydrides based on W, Nb, Ta, Ti, V, and Mo. The electrochromic device with an external power supply and a boost circuit power supply can have cathodically coloring films that include W, Nb, Ta, Ti, V, and Mo that are prepared by a number of deposition processes including vapor deposition processes, wet-coating processes, spray coating processes, dip coating, and electrodeposition.

Electrochromic Multi-Layer Stack Ion Conductors

Ion conductor layer 10 serves as a medium through which ions are transported (in the manner of an electrolyte) when the electrochromic device switches between an optically less transmissive ("colored") state and an optically more transmissive ("bleached") state. Stated differently, the ion conducting layer permits sufficient ionic conduction between the first and second electrode layers 20, 21 upon the application of a voltage across electrochromic stack 28. Depending on the choice of materials, such ions include lithium ions (Li+) and hydrogen ions (H+) (i.e., protons). Other ions may also be employed in certain embodiments. These include deuterium ions (D+), sodium ions (Na+), potassium ions (K+), rubidium ions (Rb+), cesium ions (Cs+), ammonium ions ($NH_4$+), calcium ions (Ca++), barium ions (Ba++), strontium ions (Sr++), magnesium ions (Mg++) or others. In one embodiment, ion conductor layer 10 has a lithium ion conductivity of at least about $10^{-5}$ S/cm at room temperature (i.e., 25 CC). For example, in one such embodiment, ion conductor layer 10 has a lithium ion conductivity of at least about $10^{-4}$ S/cm at room temperature. By way of further example, in one such embodiment ion conductor layer 10 has a lithium ion conductivity of at least about $10^{-3}$ S/cm at room temperature. By way of further example, in one such embodiment ion conductor layer 10 has a lithium ion conductivity of at least about $10^{-2}$ S/cm at room temperature. Preferably, ion conductor layer 10 has sufficiently low electron conductivity that negligible electron transfer takes place during normal operation. In some embodiments, the ion conductor layer is thicker than 10 microns, or thicker than 20 microns, or thicker than 30 microns, or thicker than 50 microns, or thicker than 100 microns, or thicker than 200 microns, or thicker than 500 microns, or has a thickness from 10 to 1000 microns, or from 10 to 500 microns, or from 10 to 200 microns, or from 100 to 1000 microns. The electrochromic device with an external power supply and a boost circuit power supply can have an ion conductor layer thicker than 10 microns, or thicker than 20 microns, or thicker than 30 microns, or thicker than 50 microns, or thicker than 100 microns, or thicker than 200 microns, or thicker than 500 microns, or has a thickness from 10 to 1000 microns, or from 10 to 500 microns, or from 10 to 200 microns, or from 100 to 1000 microns.

Ion conductor layer 10 is also preferably sufficiently durable so as to withstand repeated cycling of the electrochromic device between an optically less transmissive state and an optically more transmissive state. For example, in one such embodiment, lithium ion conductivity of ion conductor layer 10 varies less than about 5% upon cycling of the electrochromic device between a less transmissive state (e.g. about 5% transmissive) and a more transmissive state (e.g. about 70% transmissive) for at least 100 hours at 85° C. By way of further example, in one such embodiment lithium ion conductivity of ion conductor layer 10 varies less than about 4% upon cycling of the electrochromic device between a less transmissive state and a more transmissive state for at least 100 hours at 85° C. By way of further example, in one such embodiment lithium ion conductivity of ion conductor layer 10 varies less than about 3% upon cycling of the electrochromic device between a less transmissive state and a more transmissive state for at least 100 hours at 85° C. By way of further example, in one such embodiment lithium ion conductivity of ion conductor layer 10 varies less than about 2% upon cycling of the electrochromic device between a less transmissive state and a more transmissive state for at least 100 hours at 85° C. By way of further example, in one such embodiment lithium ion conductivity of ion conductor layer 10 varies less than about 1% upon cycling of the electrochromic device between a less transmissive state and a more transmissive state for at least 100 hours at 85° C. By way of further example, in one such embodiment lithium ion conductivity of ion conductor layer 10 varies less than about 0.5% upon cycling of the electrochromic device between a less transmissive state and a more transmissive state for at least 100 hours at 85° C.

Additionally, to enable electrochromic stack 28 to endure a range of physical stresses to which it may be exposed during the manufacture of electrochromic device 1, its incorporation into a structure (e.g., an automobile, aircraft, or building), and/or its intended end-use environment (e.g., as an architectural window, sunroof, skylight, mirror, etc., in such a structure), ion conductor layer 10 also possesses sufficient cohesion and adhesion to the first and second electrode layers 20, 21. For example, in one embodiment, ion conductor layer 10 has a lap shear strength of at least 100 kPa, as measured at 1.27 mm/min, at room temperature, in accordance with ASTM International standard D1002 or 5163. For example, in one embodiment ion conductor layer 10 has a lap shear strength of at least 200 kPa. By way of further example, in one such embodiment ion conductor layer 10 has a lap shear strength of at least 300 kPa. By way of further example, in one such embodiment ion conductor layer 10 has a lap shear strength of at least 400 kPa. By way of further example, in one such embodiment ion conductor layer 10 has a lap shear strength of at least 500 kPa. By way of further example, in one such embodiment ion conductor layer 10 has a lap shear strength of at least 600 kPa. Preferably, ion conductor layer 10 is elastically deformable. In one exemplary embodiment, ion conductor layer 10 has an elongation to failure of at least 1 mm.

Some non-exclusive examples of electrolytes typically incorporated into ion conductor layer 10 are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSl—$CF_3SO_2NLiSO_2CF_3$ (lithium bis(trifluoromethane) sulfonimide), $LiBF_4$ (lithium tetra fluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon aluminum-oxide. In some embodiments, the ion conducting layer comprises a silicate based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

Electrochromic Multi-Layer Stack Anodes

In one embodiment, the electrochromic materials comprised by the anode electrode (i.e., the first or second electrode 20, 21; see FIG. 12) of a multi-layer stack of the present disclosure are inorganic or organometallic and the electrochromic materials comprised by the cathode (i.e., the other of the first or second electrode 20, 21; see FIG. 12) are independently inorganic or organometallic. More specifically, the electrochromic materials comprised by the anode and/or the cathode are inorganic or organometallic solid state materials with 3-D framework structures comprising metals bridged or separated by anionic atoms or ligands such as oxide, hydroxide, phosphate, cyanide, halide, that further comprise mobile ions such as protons, lithium, sodium, potassium that can intercalate and de-intercalate as the material is reduced or oxidized during the electrochromic cycle.

A variety of anodically coloring films comprising Ni, Ir, and Fe are known in the art and can be prepared by a number of deposition processes including vapor deposition processes, wet-coating processes, spray coating processes, dip coating, and electrodeposition. Many of these anodic films are mixed metal oxides where lithium or protons are intercalated to balance charge during cycling. Additionally, non-oxide based films such as Prussian blue materials can be useful as anodic electrochromic films. In one embodiment, anodically coloring films include oxides, hydroxides and/or oxy-hydrides based on nickel, iridium, iron, chromium, cobalt and/or rhodium.

The electrochromic device with an external power supply and a boost circuit power supply can have a cathode that includes anodically coloring films include oxides, hydroxides and/or oxy-hydrides based on nickel, iridium, iron, chromium, cobalt and/or rhodium. The electrochromic device with an external power supply and a boost circuit power supply can have anodically coloring films including oxides, hydroxides and/or oxy-hydrides based on nickel, iridium, iron, chromium, cobalt and/or rhodium that are prepared by a number of deposition processes including vapor deposition processes, wet-coating processes, spray coating processes, dip coating, and electrodeposition.

Electrochromic Multi-Layer Stack Substrates

The "substrate" comprises an electrically conductive layer 22, 23, and an "outer substrate" 24, 25. In some embodiments, the electrically conductive layer is selected from a group consisting of: transparent conductive oxides, thin metallic coatings, networks of conductive nanoparticles (e.g., rods, tubes, dots), conductive metal nitrides, and composite conductors.

In some embodiments, the outer substrate is selected from a group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

The electrochromic device with an external power supply and a boost circuit power supply can have a substrate including glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, one or more electrically conductive layer 22, 23 of the multi-layer stack of the electrochromic device can have electrical properties that vary as a function of position. The electrochromic device with an external power supply and a boost circuit power supply can have one or more electrically conductive layers with electrical properties that vary as a function of position as described herein. One or more electrically conductive layer in the electrochromic device is transmissive to electromagnetic radiation having a wavelength in the range of infrared to ultraviolet and has a sheet resistance, $R_s$, to the flow of electrical current through the electrically conductive layer that varies as a function of position in the electrically conductive layer. In some cases, the ratio of the value of maximum sheet resistance, $R_{max}$, to the value of minimum sheet resistance, $R_{min}$, in the one or more electrically conductive layer is at least 2. In some embodiments, one or more electrically conductive layer in the electrochromic device is non-uniform as a function of position perpendicular to the bus bar 26, 27, then the resistance between the bus bar and a substantially parallel line will increase non-linearly as the distance between the bus bar and the line increases. In some cases, the bulk resistivity of the electrically conductive layer is non-uniform. In some cases, the cross-sectional area of the electrically conductive layer is non-uniform (e.g. the thickness varies across the substrate). In some cases, the electrically conductive layer may be patterned, so that the resistance from the bus bar to a substantially parallel line varies non-linearly, as is described more completely below.

Electrochromic Windows

The electrochromic device with an external power supply and a boost circuit power supply can be an electrochromic window. The electrochromic window with an external power supply and a boost circuit power supply can be part of (or integrated in) an IGU, and the boost circuit power supply can be located in the frame of the IGU.

Windows for buildings are often made as integrated glazing units (IGUs), which provide thermal insulation for the building and have an inner pane of glass and an outer pane of glass held apart by a spacer. A secondary seal typically surrounds the spacer. This works well for integrated glazing units of ordinary windows without electrochromic devices, with the spacer and the secondary seal hermetically sealing the two panes of glass and preventing moisture condensation in the inner space between the two panes. Electrical connections to bus bars of electrochromic devices pose design challenges, in an integrated glazing unit that should maintain hermetic sealing.

An integrated glazing unit (IGU) with an electrochromic device is described with details of connections to terminals of the electrochromic device, in various embodiments. Two substrates of the electrochromic device are laterally offset with respect to one another, forming a shelf or overhang that exposes some or all of the terminals of the electrochromic device. For purposes of explanation, a lateral direction is considered parallel to a plane of, or tangent to, a main body of the integrated glazing unit, and a vertical direction is considered perpendicular to the main body of the integrated glazing unit, e.g., through a thickness of the integrated glazing unit and/or extending perpendicular to a major surface of the integrated glazing unit.

Figure 13:
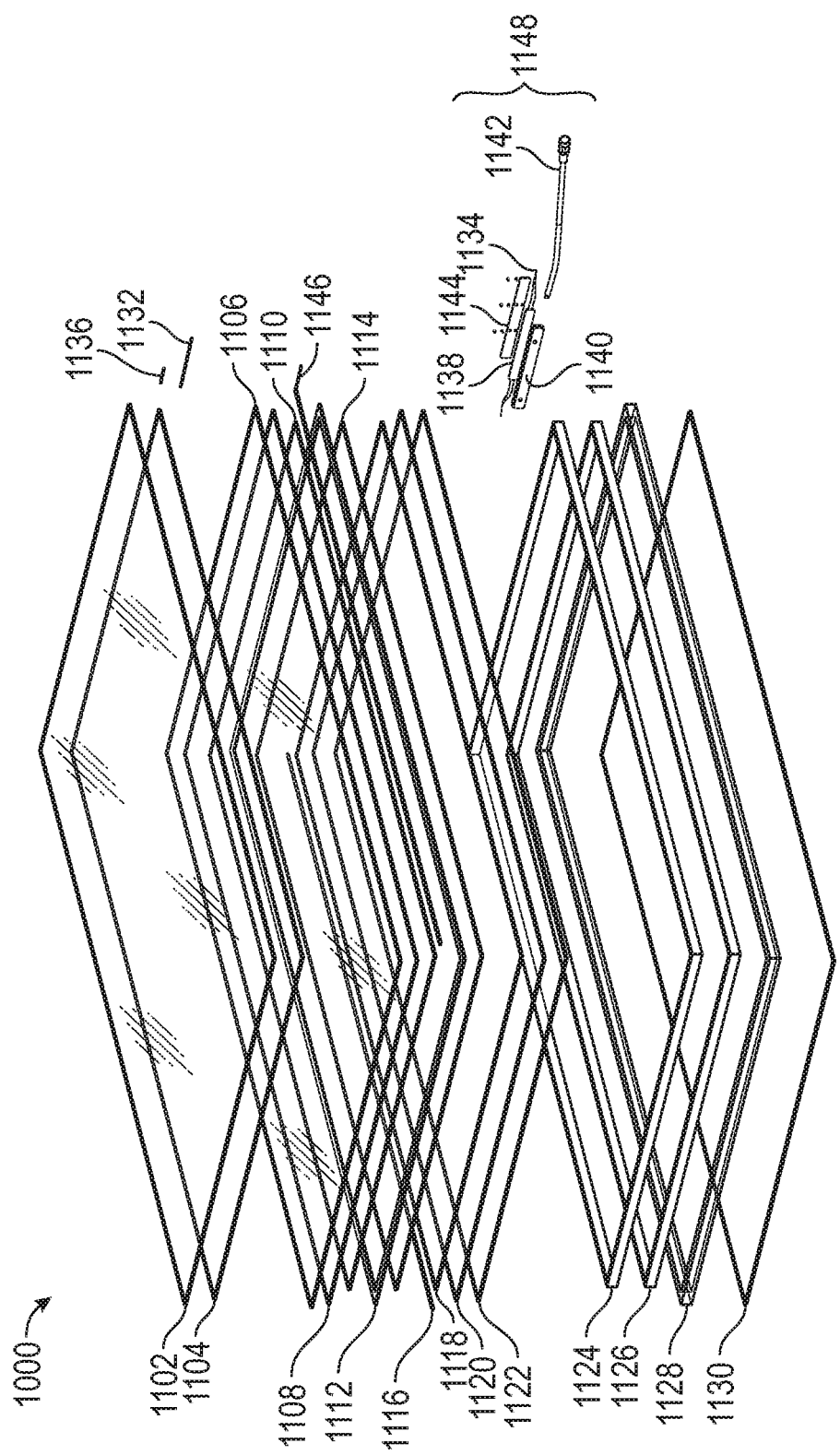
FIG. 13 is a perspective exploded view of an integrated glazing unit 100, showing layers 106, 108, 110, 114 118 120, 122 and other aspects of an electrochromic device, a spacer 124, seals 126, 128, and a driver or controller assembly 148.

FIG. 13 is a perspective exploded view of an integrated glazing unit 1100, showing layers 1106, 1108, 1110, 1114, 1118, 1120, 1122 and other aspects of an electrochromic device, a spacer 1124, seals 1126, 1128, and a driver or controller assembly 1148. Like many ordinary, non-electrochromic integrated glazing units, the present integrated glazing unit 1100 is thermally insulative and has an outer pane 1102, and an inner pane 1130, each of which could be glass or plastic or other transparent or translucent material. In addition to the outer pane 1102 and the inner pane 1130, the integrated glazing unit 1100 has an electrochromic device disposed between these panes 1102, 1130. Placing the electrochromic device closer to the outer pane 1102 than the inner pane 1130 allows the adjustable tinting of the electrochromic device to shade the inner pane 1130 and the space between the panes 1102, 1130, which decreases heating of the argon, nitrogen, air or other gas between the panes 1102, 1130 as compared to having the electrochromic device closer to the inner pane 1130. However, this is not meant to be limiting as various embodiments could have the first pane 1102 could be an outer pane or an inner pane, and the second pane 1130 could be an inner pane or an outer pane, relative to an interior space of a building in which the integrated glazing unit 1100 is installed. Although present embodiments are depicted as flat, further embodiments of the integrated glazing unit 1100 could use curved surfaces and materials, or angled surfaces, etc., and apply the mechanisms and arrangements described below.

In some embodiments, the electrochromic devices are composed of various layers of electrochromic material on a single substrate, which is then bonded to a single pane, which could be either the outer pane 1102 or the inner pane 1130 of an integrated glazing unit. The embodiment depicted in FIG. 13 has an electrochromic device with two substrates 1106, 1122 sandwiching multiple layers of electrochromic material. These substrates 1106, 1122 are typically thin glass, although plastic or other transparent or translucent material could be used in further embodiments. The layers of electrochromic material include a first transparent conductive oxide layer 1108 deposited on or otherwise attached to a first substrate 1106, a cathode layer 1110, an ion conductor layer 1114, an anode layer 1118, and a second transparent conductive oxide layer 1120 deposited on or otherwise attached to a second substrate 1122. These layers could be fabricated or assembled in various ways, or variations could be devised. For example, the cathode layer 1110 could be attached to the first transparent conductive oxide layer 1108, and the anode layer 1118 attached to the second transparent conductive oxide layer 1120, with the ion conductor layer 1114 or electrolyte applied as a gel to either the cathode layer 1110 or the anode layer 1118. Then, the two substrates 1106, 1122 could be brought together with the gel in the middle, to form the electrochromic device. A sealant 1112 is applied, in some embodiments, as a ring around the edges of the electrochromic device, to seal the first substrate 1116 and the second substrate 1122 together and protect the electrochromic material from degradation due to exposure to moisture or atmosphere. In some embodiments, poly isobutylene (FIB) is utilized as the sealant. It should be appreciated that other suitable sealant material may be integrated with the embodiments as PIB is one example of a sealant material. The seal created by the spacer 1124 and the sealant 1112 may be referred as a primary seal in some embodiments.

In some embodiments, the electrochromic device is attached to a carrier glass. In the embodiment shown in FIG.

13, electrochromic device is attached to the outer pane 1102, using a film layer 1104, which could be an ethylene vinyl acetate (EVA) layer, an ultraviolet activated adhesive, or other transparent or translucent bonding material. The spacer 1124 is attached to the second substrate 1122, for example with a poly isobutylene (FIB) layer. The secondary seal 1126 surrounds the spacer 1124 laterally. Completing the integrated glazing unit lamination, the inner pane 1130 is attached to the spacer 1124 and the secondary seal 1126. Thus, the electrochromic device is a laminate, the electrochromic device and the outer pane 1102 are a laminate, and the outer pane 1102, the electrochromic device and the inner pane 1130 are a laminate, or laminated structure or laminated device. A gap or inner space between the second substrate 1122 and the inner pane 1130 can be filled with argon, nitrogen, dry air or other gas, to provide thermal insulation as a general characteristic of integrated glazing units. A tertiary seal 1128 surrounds the secondary seal 1126 and provides further sealing for the integrated glazing unit 1100. In some embodiments, the tertiary seal 1128 is applied as a liquid, gel or semisolid, such as a potting compound, which then cures to a flexible texture. Some embodiments use a thicker first substrate 1116 and/or second substrate 1122, and omit the outer pane 1102 and/or the inner pane 1130. In a further embodiment, the outer pane 1102 has a first electrochromic device, and the inner pane 1130 has a second electrochromic device. This arrangement allows lower transmission in the fully darkened state, i.e., when both electrochromic devices are darkened.

Bus bars 1116, 1146 are formed on the substrates 1106, 1122, for controlling transmissivity of the electrochromic device. For example, an anode bus bar 1116 could be formed along or proximate to one edge of the second substrate 1122 prior to or after depositing the second transparent conductive oxide layer 1120 onto the second substrate 1122. A cathode bus bar 1146 could be formed along or proximate to an opposite edge of the first substrate 1106, prior to or after depositing the first transparent conductive oxide 1108 onto the first substrate 1106. One technique for depositing bus bars 1116, 1146 onto glass is to deposit down molten solder (e.g., a solder line) onto glass. Then, transparent conductive oxide can be deposited on to the solder and the glass. Or, transparent conductive oxide can be deposited to the glass, and then the solder is deposited on top of the transparent conductive oxide. In the embodiment shown, the anode bus bar 1116 and cathode bus bar 1146 are at or near opposed edges of the electrochromic device, and on opposed faces of electrochromic material. That is, the bus bars 1116, 1146 are attached to respective transparent conductive oxide layers 1108, 1120 on opposite sides of the thickness of the combination of the cathode layer 1110, the ion conductive layer 1114 and the anode layer 1118. The bus bars 1116, 1146 are at or near opposed edges of the combination of the cathode layer 1110, the ion layer 1114 and the anode layer 1118 in some embodiments. In further embodiments, multiple bus bars could be located in various ways, for example to establish multiple zones of control and corresponding multiple zones of independently controlled tinting of the electrochromic device.

In some embodiments, the electrochromic device has sequestration and/or sense pads 1136. Sequestration allows charge of the electrochromic device to be sequestered in a sequestration region, controlled by two sequestration terminals which act as bus bars for the sequestration region, or one sequestration terminal and one bus bar 1116, or other variation as readily devised in keeping with the teachings herein. Sensing allows a voltage of the electrochromic device to be measured at one or more sense terminals. Two sense terminals could be used to measure sense voltage independently of the bus bars 1116, 1146 in some embodiments. One sense terminal could be used to measure sense voltage in comparison with one of the bus bars 1116, 1146, e.g., voltage across the sense terminal and the bus bar 1116 or voltage across the sense terminal and the bus bar 1146. Three or more sense terminals, or other variations to measure further sense voltages are readily devised in keeping with the teachings herein. In various embodiments, and in various combinations, the bus bars 1116, 1146, one or more sequestration terminals and/or one or more sense terminals include or are made of solder as described above for the bus bars 1116, 1146. Other materials could be used, in further embodiments.

Figure 14:
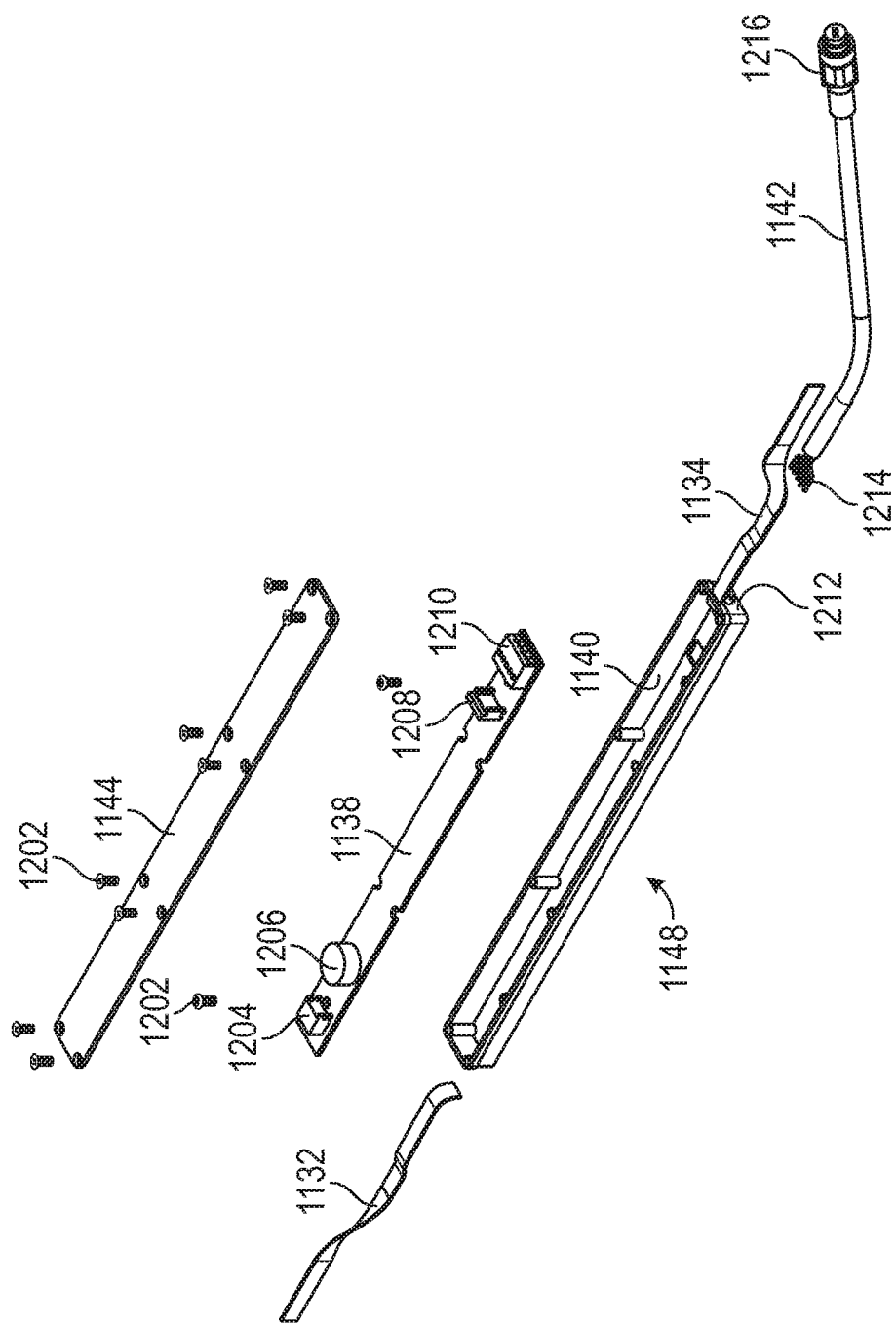
FIG. 14 is a perspective exploded view of the controller assembly 148 of the integrated glazing unit 100 of FIG. 13.
Figure 15:
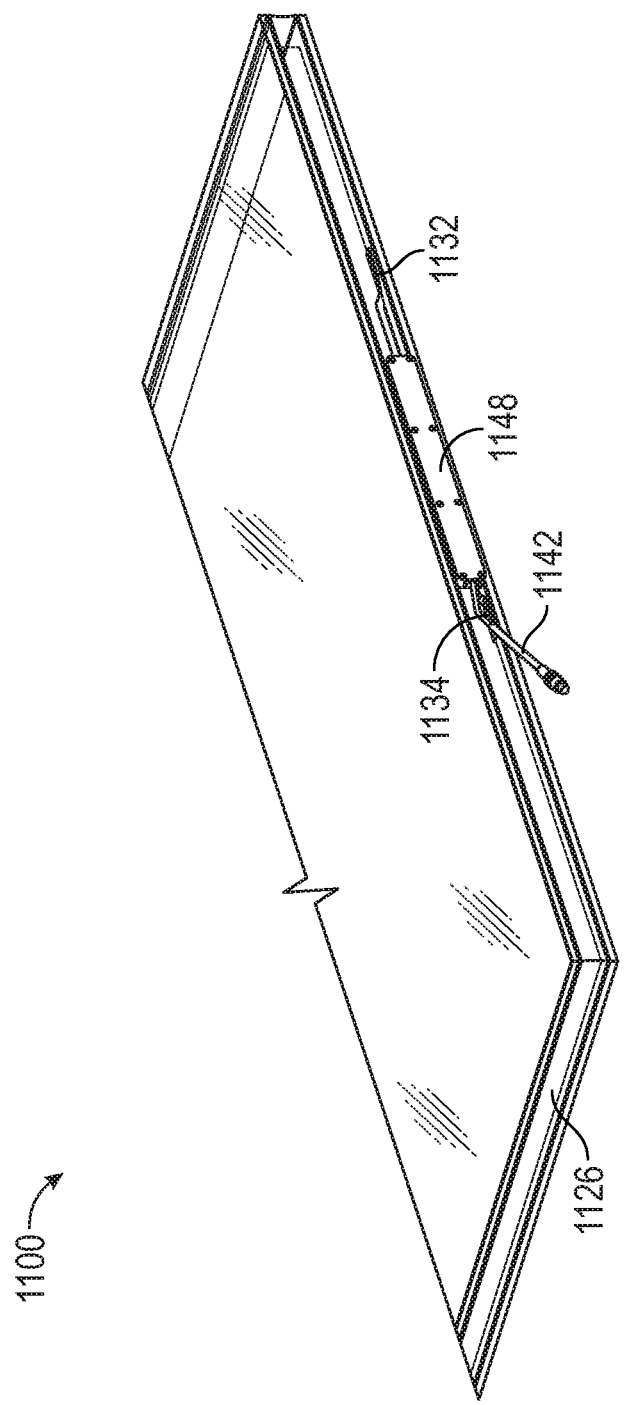
FIG. 15 is a perspective view of the assembled integrated glazing unit 100 with the controller assembly 148 flush with or recessed from an edge of the integrated glazing unit 100.

In various embodiments, the driver or controller assembly 1148 is mounted to, assembled to, or integrated with the integrated glazing unit 1100. As illustrated in FIGS. 13-15, the controller assembly 1148 is attached to an edge of the electrochromic device and the integrated glazing unit 1100, but could be mounted elsewhere. Controller assembly 1148 may be referred to as a driver assembly in some embodiments. An enclosure 1140, and a cover 1144, both of which could be made of plastic, metal or other durable material form a housing. Inside the housing is a controller board 1138 with electronic components for controlling or driving the electrochromic device. In some embodiments, controller board 1138 may be referred to as a driver board. Two flex circuits 1132, 1134 or other wiring couple the controller board 1138 to the bus bars 1116, 1146 and, in some embodiments, the sequestration and/or sense pads 1136. A power and communication cable 1142 extends from the housing (i.e., the enclosure 1140 and the cover 1144, and through an aperture in one, the other or both), to couple the controller board 1138 to external power and communications. For example, controller board 1138 may couple to a network connector with power over Ethernet (POE) capability. In variations, the controller assembly 1148 includes a wireless module and does not require communication through the cable 1142. In some embodiments, the controller assembly 1148 uses solar cells, one or more batteries, or other local power supply, and does not require power to the cable 1142. The controller assembly 1148 could have both wireless and local power supply capabilities, and not use a cable 1142 at all in some embodiments. In some embodiments, the external power supply is connected to the electrochromic device through the cable 1142. In some embodiments, the external power supply and boost circuit power supply are connected to the electrochromic device through the cable 1142. In some embodiments, the external power supply and boost circuit power supply are connected to the electrochromic device through the cable 1142, and the boost circuit power supply is located close to the electrochromic device (e.g., less than 1 m away). In some embodiments, the controller assembly 1148 can include the boost circuit power supply. In some embodiments, the external power supply is connected to the electrochromic device through the cable 1142, and the boost circuit power supply is included in the controller assembly 1148. In some embodiments, the electrochromic device with an external power supply and a boost circuit power supply is integrated into an IGU and the boost circuit power supply is included in the controller assembly 1148, and the external power supply is connected to the electrochromic device through the cable 1142. The electrochromic device with an external power supply and a boost circuit power supply can be integrated into an IGU and the boost circuit power supply and boost circuit power supply battery can be included in the controller assembly 1148, and the external power supply can be connected to the electrochromic device through the cable 1142.

FIG. 14 is a perspective exploded view of the controller assembly 1148 of the integrated glazing unit 1100 of FIG. 13. To assemble the controller assembly 1148, the controller board 1138, with various electronics components 1204, 1206, 1208, 1210 mounted to the controller board 1138, is placed inside the enclosure 1140. In some embodiments, these electronic components 1206, 1208 can include the boost circuit power supply, the boost circuit power supply battery, and various driver electronics as described herein. A fastener 1202 may be used to secure the controller board 1138 to the enclosure 1140, or tabs, slots or other mechanical features or devices could be used. The flex circuits 1132, 1134, which have flexible wires on a flexible substrate, are assembled to the controller board 1138, for example with the use of zero insertion force (ZIF) connectors (e.g., two of the components 1204, 1210) on the controller board 1138. This could be done before or after the controller board 1138 is placed in the enclosure 1140, and before or after the flex circuits 1132, 1134 are assembled to terminals of the electrochromic device. Likewise, the cable 1142 could be assembled, at various times or stages in the assembly process, to the controller board 1138. The cover 1144 is assembled to the enclosure 1140, with a fastener 1202 or other feature or device such as snap connection, adhesive, sliding grooves, etc. In some embodiments, potting compound or other filler is used in place of a cover 1144. Variations on the driver or controller assembly 1148 are readily devised in keeping with the teachings herein. In some embodiments, the controller assembly 1148 can include the boost circuit power supply, the boost circuit power supply energy storage (e.g., a battery), the driver electronics, and other electronics.

FIG. 15 is a perspective view of the assembled integrated glazing unit 1100 with the controller assembly 148 flush with or recessed from an edge of the integrated glazing unit 1100. In some embodiments, the controller assembly 1148 is flush with or recessed from an edge of the electrochromic device. To create sufficient space for flush or recessed mounting of the controller assembly 1148, the secondary seal 1126 is recessed from the edge of the integrated glazing unit 1100 in some embodiments. This creates a recess, e.g., a recessed region or volume, bounded by the spacer 1124, the second pane 1130, the electrochromic device, and/or the first pane 1102 (see FIG. 13 and also FIGS. 16-18), into which the controller assembly 1148 can be assembled or disposed. The tertiary seal 1128 (see FIG. 13) could be applied after the flex circuits 1132, 1134 are coupled to the electrochromic device (see FIGS. 16-18), and before or after the controller assembly 1148 is seated flush with or recessed from the edge of the integrated glazing unit 1100. When present in an embodiment, the cable 1142 extends from the controller assembly 1148 and from the tertiary seal 1128.

Figure 16:
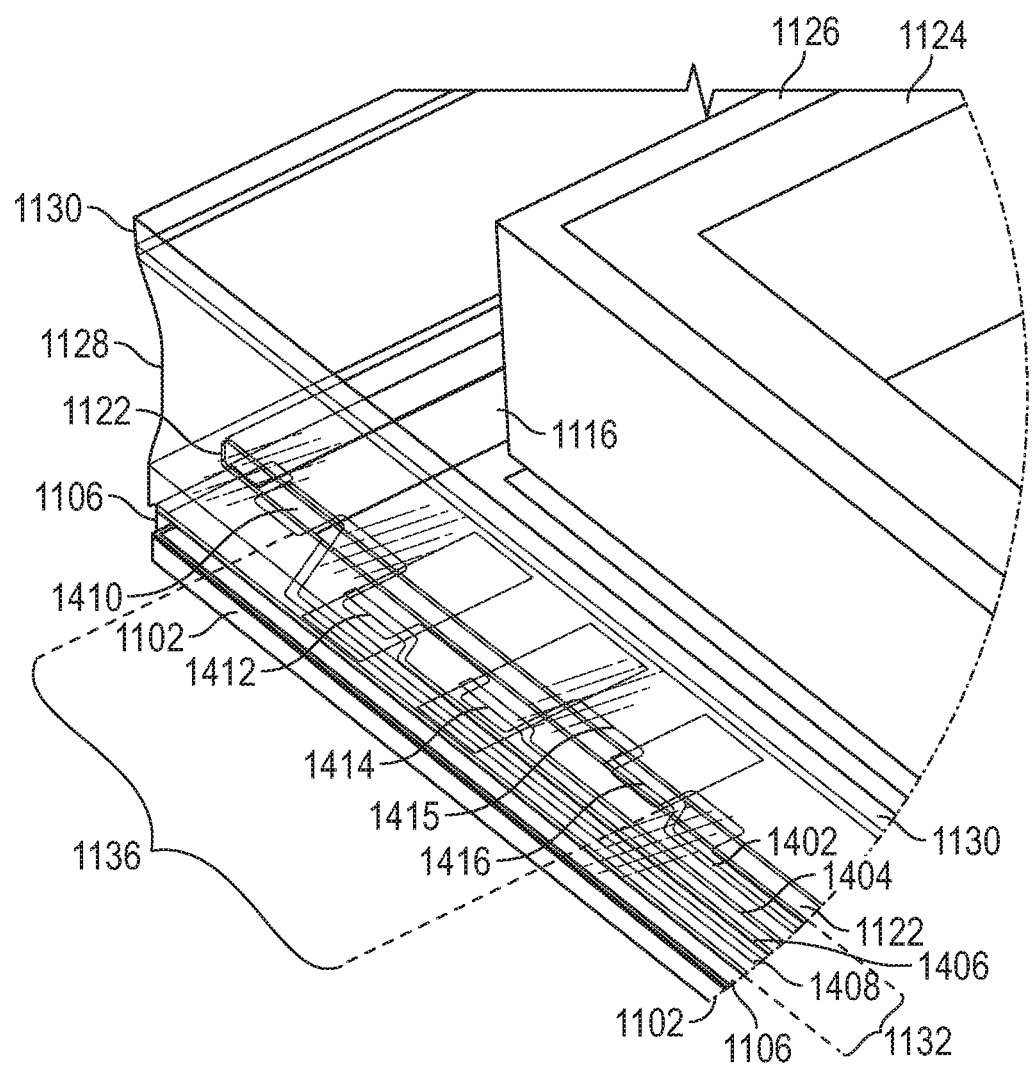
FIG. 16 is a perspective view of one corner of the integrated glazing unit 100, showing terminals 412, 414 of the electrochromic device in a region where one substrate 122 of the electrochromic device is offset from another substrate 106 of the electrochromic device to expose the terminals 412, 414.

FIG. 16 is a perspective view of one corner of the integrated glazing unit 1100, showing terminals 1412, 1414 of the electrochromic device in a region where one substrate 1122 of the electrochromic device is offset from another substrate 1106 of the electrochromic device to expose the terminals 1412, 1414. This view is upside down, in comparison with the view shown in FIG. 13, and can be visualized as taking the materials shown in FIG. 13, and assembling them, then rotating the resultant assembly along a horizontal axis extending diagonally from top left to lower right in FIG. 13. Thus, the illustration in FIG. 16 is showing the far left corner, formerly the far right corner at the top of FIG. 13. One of the flex circuits 1132 is shown split into four wires 1402, 1404, 1406, 1408, which couple, respectively, to terminals 1416, 1414, 1412, 1410 of the electrochromic device, although other arrangements of wires or a flex circuit could be devised in variations.

There are multiple embodiments for how the substrate 1122 is offset from the other substrate 1106 (and equivalently, vice versa). The two substrates 1122, 1106 could be laterally displaced, one relative to the other, and then assembled together as a lamination. For example, the first substrate 1106 could be moved rightward relative to the second substrate 1122 in FIG. 13 or leftward relative to the second substrate 1122 in FIG. 16 in some embodiments. The second substrate 1122 could be moved leftward relative to the first substrate 1106 in FIG. 13 or rightward relative to the first substrate 1106 in FIG. 16 in some embodiments. The second substrate 1122 could be laser cut or otherwise cut before or after assembly to the first substrate 1106. The two substrates 1106, 1122 could be cut to differing dimensions, e.g., the second substrate 1122 shorter than the first substrate 1106. In some embodiments, the edge of the second substrate 1122 is shaped in a series of notches and tabs, with the terminals 1410, 1412, 1414, 1416 (and also the terminal 1502 shown in FIG. 18) extending laterally outward from the main body of the second substrate 1122 as the tabs or portions of the tabs, as shown in the ghost line 1415 in FIG. 16. In variations, this could be done with the first substrate 1106, or both substrates 1106, 1122. The offset creates an overhang or shelf, with one edge of the second substrate 1122 recessed from one edge of the first substrate 1106 and terminals 1412, 1414 that are exposed, i.e., not covered or otherwise obscured by the second substrate 1122. The overhang or shelf is an exposed portion of the first substrate 1106, e.g., with the first transparent conductive oxide layer 1108 (see FIG. 13) showing. Preferably, the cathode layer 1110, ion conductor layer 1114, and anode layer 1118 are absent on the overhang or shelf, either by trimming these materials back or otherwise removing them from, or not depositing them in the first place on, the overhang or shelf region, so that access to the terminals 1410, 1412, 1414, 1416 (and terminal 1502) is readily available without obscuring material. The overhang or shelf could include an entire edge of the electrochromic device, or a portion of an edge, one or two corners (and a portion or entirety of an edge), or more than one edge, etc. Further, the overhang or shelf contributes to defining the recess described above with reference to FIG. 15, with the inward displacement of the edge of the second substrate 1122 contributing to the volume of the recess.

There are multiple embodiments for how the wires 1402, 1404, 1406, 1408 couple to the terminals 1416, 1414, 1412, 1410. The two terminals 1412, 1414 that are exposed by the offset of the second substrate 1122 relative to the first substrate 1106 could each have a wire 1406, 1404 soldered to them, manually, or with an automated soldering device, or with solder reflow. In some embodiments, these terminals 1412, 1414 are a sequestration terminal and a sense terminal. Terminals 1116 and 1416 are deposited on the second substrate 122. The flex circuit 1132 is reflow soldered to these terminals prior to assembling the second substrate 1122 and the first substrate 1106 together, in one embodiment. On first substrate 1106, terminals 1412 and 1414 are deposited so that the terminals are exposed on the step (also referred to as the shelf or overhang) of first substrate 1106 and extend some distance under the second substrate 1122. The flex circuit 1132 traces that overlap terminals 1412 and 1414 are then reflow soldered together as the traces overlapping the terminals are exposed on the shelf or overhang. In FIG. 16, the anode bus bar 1116 (or, in further embodiments this could be a cathode bus bar) is shown as a line of solder along or near an edge of a back or downward face of the second substrate 1122 (or front, upward face of the second substrate 1122 in FIG. 13), with the bus bar 1116 and the second substrate 1122 covered by the second transparent conductive oxide layer 1120. That is, from top to bottom in FIG. 16, the second substrate 1122 is followed by the bus bar 1116 (seen through the second substrate 1122) and then the transparent conductive oxide layer 1120 (see FIG. 13). The wire 1408 could be attached to the bus bar 1116 by removing a portion of the transparent conductive oxide layer 1120 to expose a portion of the bus bar 1116 as the terminal 1410, or the transparent conductive oxide layer 1120 could be deposited so as to leave a portion of the bus bar 1116 exposed as the terminal 1410. Then, the wire 1408 could be attached to the bus bar 1116 by manual soldering, automated soldering or solder reflow. Similarly, the wire 1402 could be attached to the terminal 1416, a further sense terminal in this embodiment, by exposing a portion of the terminal 1416. An electrically insulative material could be applied, or various layers of the electrochromic device suitably dimensioned or arranged, so that the first transparent conductive layer 1108 does not electrically short to the second transparent conductive layer 1120 during soldering operations. In variations, other electrical connection materials or mechanisms could be applied for connecting wires to terminals. In embodiments where the transparent conductive oxide layer 1108 is first applied to the second substrate 1122 prior to laying down the bus bar 1116, the corresponding wire 1408 is readily attached to the bus bar 1116 without need of removing or further dimensioning of the transparent conductive oxide layer 1108.

Figure 17:
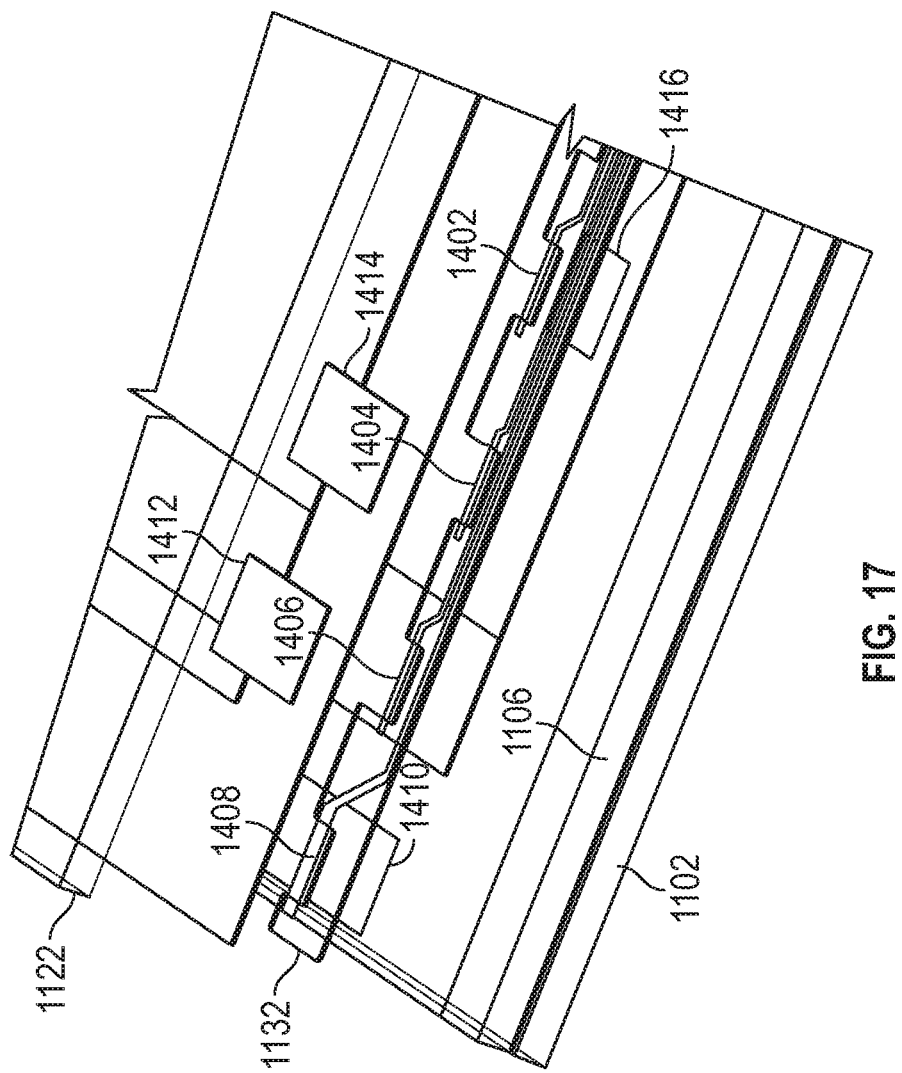
FIG. 17 is a perspective exploded view of the corner of the integrated glazing unit 100 shown in FIG. 16.

FIG. 17 is a perspective exploded view of the corner of the integrated glazing unit 1100 shown in FIG. 16. Notches in the flex circuit 1132 expose portions of wires 1402, 1404, 1406, 1408. The exposed portions of the wires 1402, 1404, 1406, 1408 are available for connection to the respective terminals 1416, 1414, 1412, 1410 of the electrochromic device. In the embodiment shown, these terminals 1410, 1412, 1414, 1416 include or are made of solder. A reflow process (using applied heat) melts the solder, which then electrically and physically bonds the wire to the terminal, for each wire and terminal pair in some embodiments. This process takes place in the shelf or overhang region created by the offset of the second substrate 1122 relative to the first substrate 1106. In some embodiments, the connections to the terminals 1410 and 1416 are made before the first substrate 1106 and second substrate 1122 are paired, and these connections are embedded within the device. In such embodiments, the process in the shelf or overhang region applies to the terminals 1412 and 1414. It should be appreciated that FIG. 17 is an exploded view for illustrative and explanation purposes and in actuality terminals 1410 and 1416 are closer to substrate 1122 and terminals 1412 and 1414 are closer to substrate 1106, as illustrated in FIG. 16.

Figure 18:
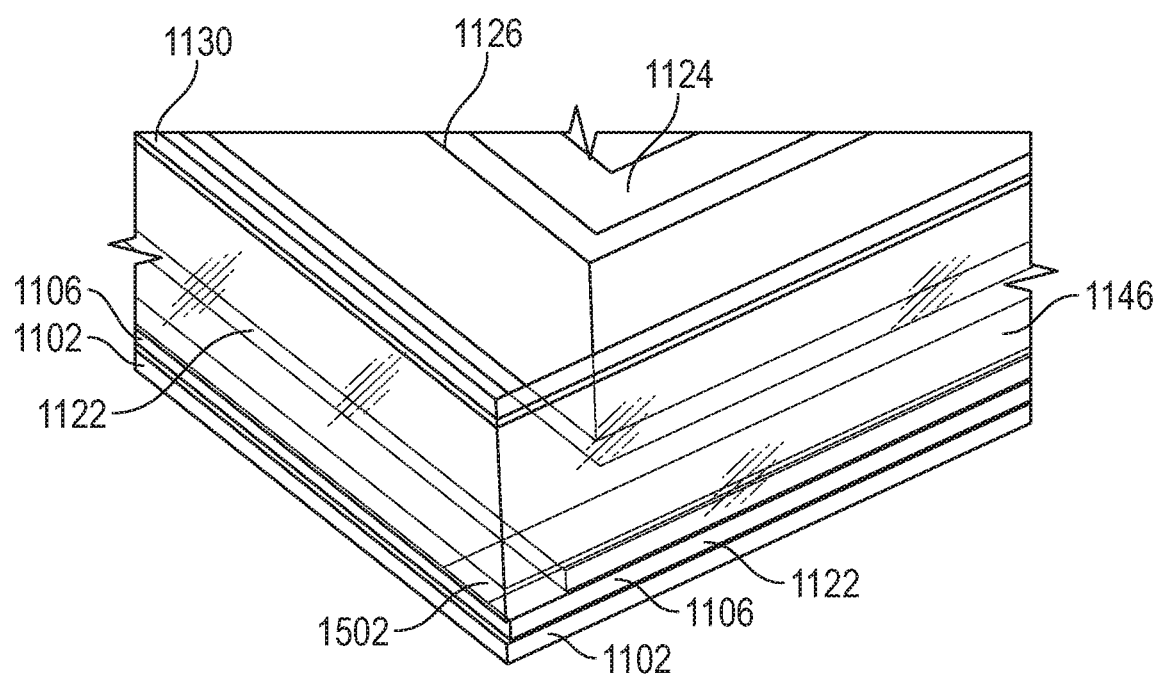
FIG. 18 is a perspective view of another corner of the integrated glazing unit 100, showing an exposed terminal 502 of the electrochromic device.

FIG. 18 is a perspective view of another corner of the integrated glazing unit 1100, showing an exposed terminal 1502 of the electrochromic device. This corner can be visualized as the near left companion to the corner shown in FIG. 16, and viewed upside down from the near right corner of the integrated glazing unit 1100, depicted on the right side of FIG. 13. In this embodiment, the terminal 1502 is a bus bar terminal of the cathode bus bar 1146, but could be a terminal of an anode bus bar in further embodiments, or some other terminal. Similar to the terminals 1412, 1414, the terminal 1502 is exposed by the offset of the second substrate 1122 relative to the first substrate 1106. It should be appreciated that the cathode layer 1110, ion conductor layer 1114 and anode layer 1118 are absent on this portion of the overhang or shelf, and the first transparent conductive oxide layer 1108 is either removed from or is beneath (relative to the drawing orientation) the solder line at the portion of the solder line that forms the terminal 1502. Various combinations of these, in various embodiments, expose the terminal 1502 for connection. A wire of the flex circuit 1132 is connected to the terminal 1502 by soldering as described above.

The shelf or overhang region described above provides ample space for connection of the flex circuit 1132, 1134 to various terminals of the electrochromic device. In comparison, and electrochromic device with no shelf or overhang region, and two substrates with no offset, offers no such area for connection to terminals of the electrochromic device. Attempting to insert wires or a flex circuit between the two substrates, for example by prying apart the two substrates, could damage the electrochromic device and/or the substrates. Connecting wires or a flex circuit to terminals of an electrochromic device and then attempting to sandwich two substrates together might result in a gap between the two substrates as a result of the thickness of the wires or the flex circuit. A solder reflow process might be difficult or impossible when the solder lines are trapped between two substrates and not exposed as the shelf or overhang region allows.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

Electrochromic Device with Boost Circuit Power Supply

Figure 19:
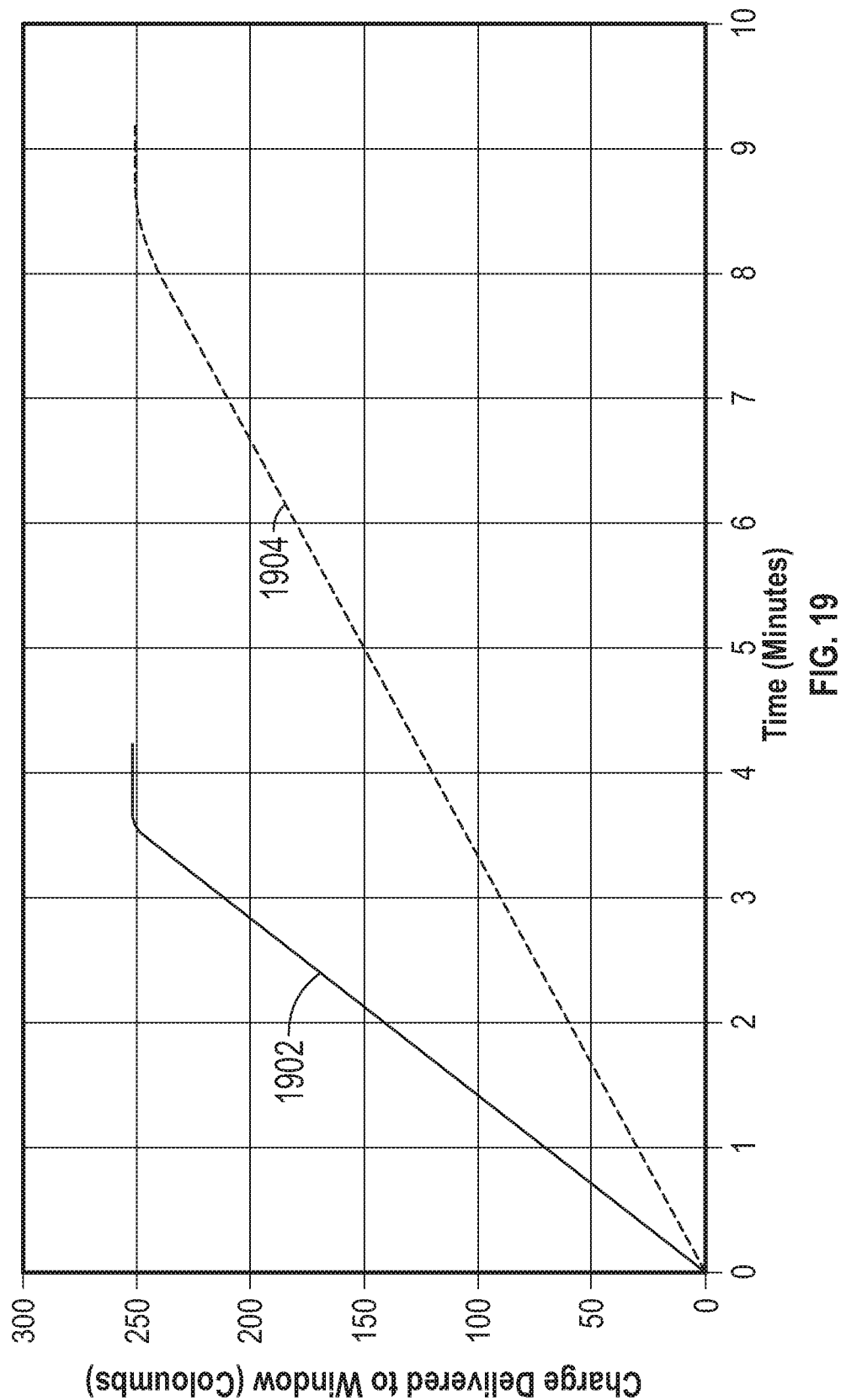
FIG. 19 shows charge delivered at two different rates to an electrochromic device over time. Charge is delivered at a higher rate using boost circuitry.

FIG. 19 shows charge delivered to two different electrochromic devices over time. The y-axis is charge delivered to the electrochromic device in coulombs, and the x-axis is time. The electrochromic device is in this example is an electrochromic window that is approximately rectangular with the dimensions 0.8×1.4 m. This particular device requires approximately 250 C of charge to switch from a first optical transmission state to a second optical transmission state.

The dashed curve 1904 shows the charge delivered over time to an electrochromic device from an external power supply that is configured to supply a limited amount of power. The window takes approximately 8.5 minutes to switch from the initial optical transmission state to the final optical transmission state.

The solid curve 1902 shows the charge delivered over time to an electrochromic device from the same external power supply as above that is configured to supply a limited amount of power, and a boost circuit power supply. The maximum amount of power that the external power supply can supply to the window again is XXXX W. However, in this case, the driver for the electrochromic window determined that the window requires more power than the limited amount of power that can be supplied by the external power supply, and the boost circuit power supply is supplying power to the electrochromic window. The window with the boost circuit only takes approximately 3.5 minutes to switch from the initial optical transmission state to the final optical transmission state.

This example illustrates some common design limitations often imposed on electrochromic window systems that have effects on the window switching speed. The external power supply is often constrained to be small and therefore only capable of supplying a limited amount of power, due to constraints on system cost and power consumption efficiency. The size and current carrying capacity of the wires connecting the external power supply to the window are also often constrained, due to constraints on system cost and window integration into architectural designs. Both a low power external power supply and low current carrying capacity connecting wires limit the amount of power that can be supplied to the electrochromic window, which limits the switching speed of the device. The boost circuit power supply that is located local to the electrochromic device solves these problems. A local power supply that is capable of delivering large amounts of power when the window is switching can increase the switching speed of the window. While the window is not switching the external power supply can be supplying small amounts of power to recharge the local power supply. Since the external power supply is sized appropriately to supply low power, the overall energy consumption efficiency of the system increases. The local boost circuit power supply does add cost to the system, but the added cost is far less than the cost that would be required to achieve the fast switching speed with larger external power supplies and larger wires connecting the external power supplies to the window.

Figure 20:
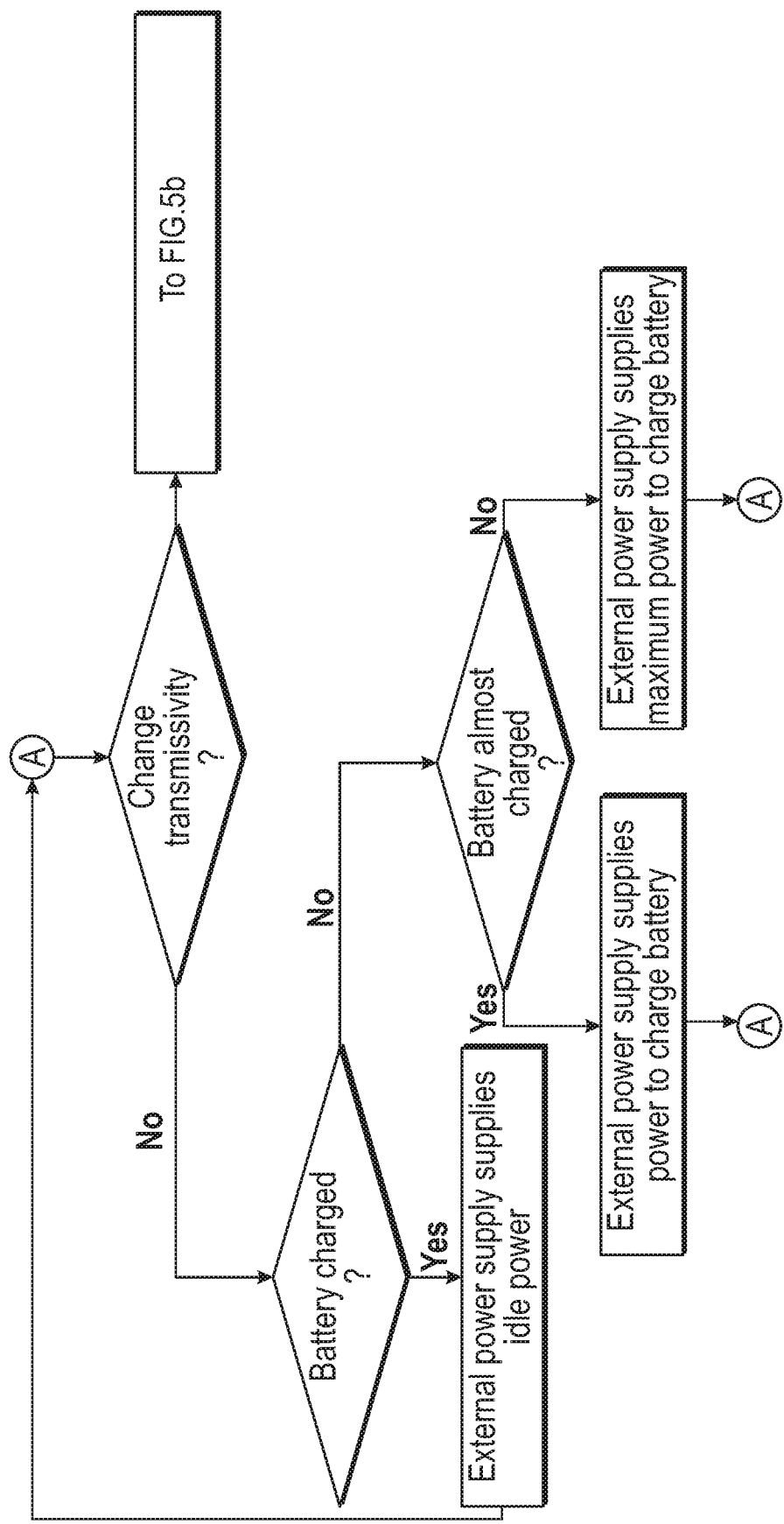
FIGS. 20 and 21 show a flow diagram of a method for operating a power supply and boost circuit to supply power for an electrochromic window (or, in further embodiments, another electrically powered device).
Figure 21:
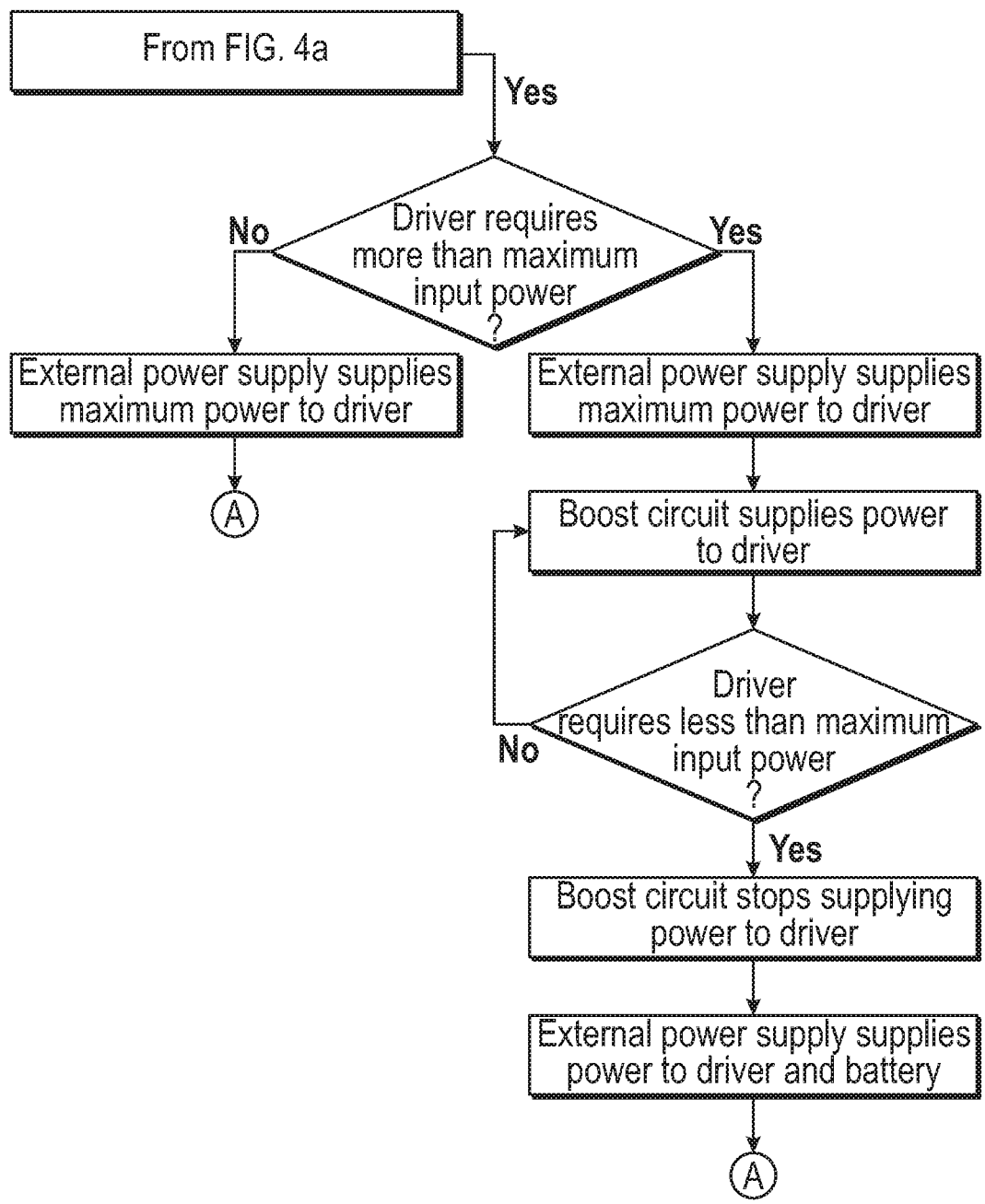

FIGS. 20 and 21 show a flow diagram of a method for operating a power supply and boost circuit to supply power for an electrochromic window (or, in further embodiments, another electrically powered device). The method can be practiced using various embodiments of the boost circuit and various embodiments of the electrochromic window. In FIG. 20, a decision action with entry point "A" determines whether to change transmissivity of the electrochromic window. If the transmissivity is to be changed, the flow proceeds to FIG. 21. If the transmissivity is not to be changed, flow proceeds to the decision action to determine whether the battery is charged. If the battery is charged, an external power supply supplies idle power, in an action. If the battery is not charged, a decision action determines whether the battery is almost charged. If the battery is almost charged, the external power supply supplies power to charge the battery, in an action, and flow proceeds to the entry point "A" to determine whether to change transmissivity. If the battery is not almost charged, then the external power supply supplies maximum power to charge the battery, in an action, and flow proceeds to the entry point "A" to determine whether to change transmissivity.

In FIG. 21 the flow enters from FIG. 20, with the determination to change the transmissivity of the electrochromic window. In a decision action, it is determined whether the driver requires more than a maximum input power. If not, the external power supply supplies power to the driver, in an action, and flow proceeds to the entry point "A" in FIG. 20. If the driver does require more than the maximum input power, flow proceeds to an action in which the external power supply supplies maximum power to the driver, and an action in which the boost circuit supplies power to the driver. Next, a decision action determines whether the driver requires less than the maximum input power. If the answer in this decision action is no, flow proceeds back to the action in which the boost circuit supplies power to the driver, and loops to the decision action to determine whether the driver requires less than the maximum input power. If the answer is yes, the driver requires less than the maximum input power, flow proceeds to an action in which the boost circuit stops supplying power to the driver, in an action in which the external power supply supplies power to the driver and the battery. After these actions, flow proceeds back to the entry point "A" in FIG. 20.

Example 2

Figure 22:
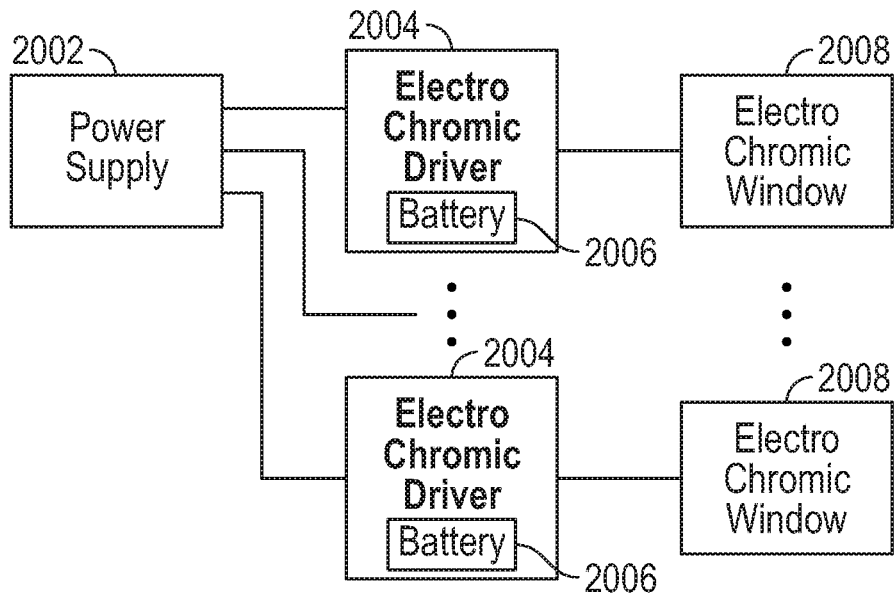
FIG. 22 shows multiple electrochromic windows and a distributed boost circuit power supply system.

System Diagram of Distributed Boost Circuit Power Supply System and Electrochromic Windows FIG. 22 shows multiple electrochromic windows and a distributed boost circuit power supply system. In this embodiment, each electrochromic window 2008 has an electrochromic driver 2004, and each electrochromic driver 2004 has a battery 2006. A system power supply 2002 is connected to each of the electrochromic drivers 2004. The battery 2006 provides the boost power, as described above, for the electrochromic driver 2004 and the associated electrochromic window 2008. Power delivery from the power supply 2002, to each electrochromic driver 2004 is constrained as described above. In various embodiments, multiple electrochromic drivers 2004 could be grouped together into a driver cabinet, supplying power for multiple electrochromic windows 2008, with the electrochromic windows 2008 separated from the electrochromic drivers 2004 and batteries 2006. A system could have one or more of these driver cabinets. The power supply 2002 could be housed in a power supply cabinet.

In further embodiments, each electrochromic driver 2004 could have a power supply 2002, a battery could provide boost to more than one electrochromic driver 2004, an electrochromic driver 2004 could supply driving power to more than one electrochromic window 2008, and so on. Also, although depicted as separated from the electrochromic window 2008, in further embodiments an electrochromic driver 2004 and/or a battery 2006 could be integrated with an electrochromic window 2008, for example by embedding one or both of these in a frame of the electrochromic window 2008 or between layers of materials of the electrochromic window 2008.

Example 3

Figure 23:
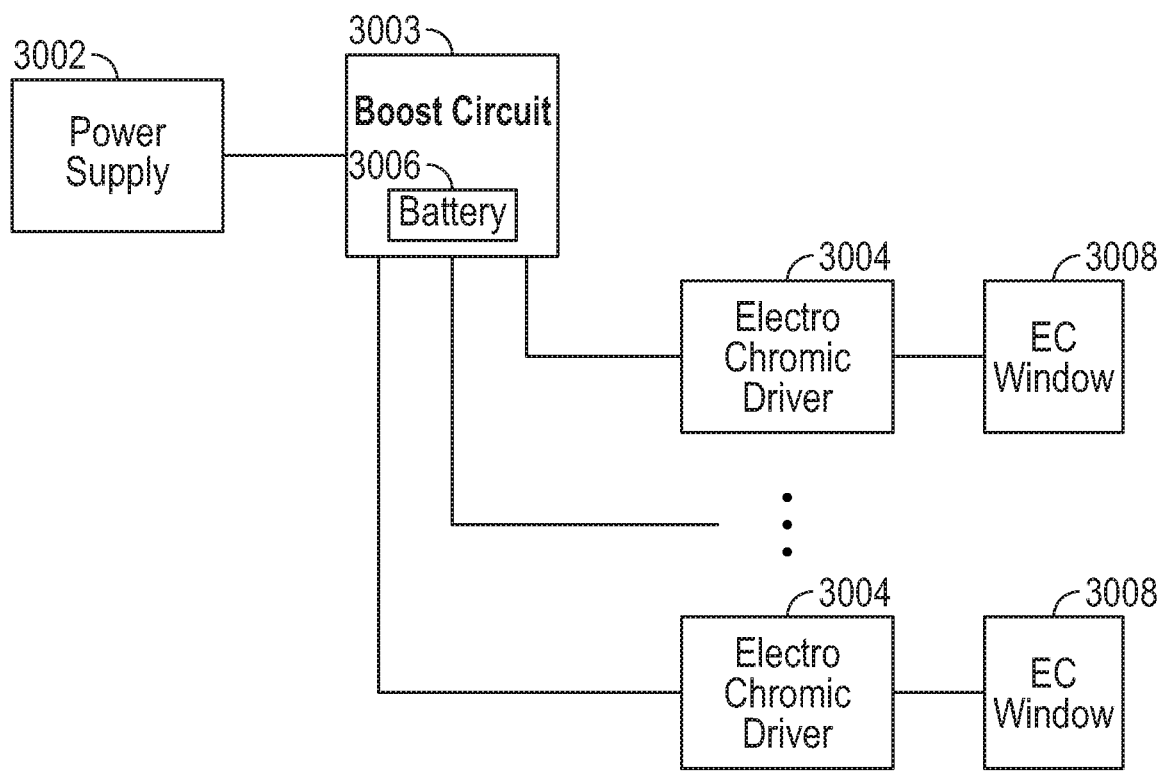
FIG. 23 shows multiple electrochromic windows and a system with a single boost circuit power supply.

System Diagram of Single Boost Circuit Power Supply System for Multiple Electrochromic Windows FIG. 23 shows multiple electrochromic windows and a single boost circuit power supply system. In this embodiment, each electrochromic window 3008 has an electrochromic driver 3004. A system power supply 3002 is connected to a boost circuit 3003 having a battery 3006. The single boost circuit is connected to multiple electrochromic drivers 3004. The battery 3006 provides the boost power, as described above, for the electrochromic drivers 3004 and the associated electrochromic windows 3008. Power delivery from the power supply 3002, to each electrochromic drivers 3004, through the single boost circuit 3003, is constrained as described above. In various embodiments, multiple electrochromic drivers 3004 could be grouped together into a driver cabinet, supplying power for multiple electrochromic windows 3008, with the electrochromic windows 3008 separated from the electrochromic drivers 3004. A system could have one or more of these driver cabinets. The power supply 3002 could be housed in a power supply cabinet. In some embodiments, the boost circuit 3003 could be in the cabinet with the electrochromic drivers 3004. In some embodiments, the boost circuit 3003 could be in the power supply cabinet with the power supply 3002. In other embodiments, the boost circuit could be located in a separate boost circuit cabinet.

Although depicted as separated from the electrochromic window 3008, in further embodiments an electrochromic driver 3004 could be integrated with an electrochromic window 3008, for example by embedding one or both of these in a frame of the electrochromic window 3008 or between layers of materials of the electrochromic window 3008.

What is claimed is:

1. An electrochromic system, comprising:
   an electrochromic device; and
   a driver, the driver comprising:
   an external power supply configured to supply a limited amount of power to the electrochromic device; and
   a boost circuit power supply that is coupled to the electrochromic device and configured to supply power to the electrochromic device that is larger than the limited amount of power supplied by the external power supply, wherein a maximum power output of the external power supply is smaller than a maximum power output of the boost circuit power supply; and
   a power supply control module configured to perform actions comprising:
   supplying a constant current from the external power supply, the boost circuit power supply, or both power supplies to the electrochromic device;
   stopping the supplying the constant current when one of a sense voltage of the electrochromic device attains a sense voltage limit or an amount of charge transferred to the electrochromic device attains a target amount of charge; and
   controlling one of a variable voltage or a variable current from the external power supply, the boost circuit power supply, or both power supplies to the electrochromic device to maintain the sense voltage at the sense voltage limit while the amount of charge transferred to the electrochromic device is less than the target amount of charge.

2. The electrochromic system of claim 1, with the driver and the boost circuit power supply located within less than 1 m from the electrochromic device.

3. The electrochromic system of claim 1, further comprising a lithium iron phosphate battery.

4. The electrochromic system of claim 1, with the boost circuit power supply comprising a capacity from 1000 to 1500 mAh.

5. The electrochromic system of claim 1, with the external power supply configured to supply less than 25% of a maximum power used by the electrochromic device during switching.

6. The electrochromic system of claim 1, with the external power supply further comprising connecting wires greater than AWG gauge 15.

7. The electrochromic system of claim 1, with the external power supply configured to provide power wirelessly to the electrochromic device.

8. The electrochromic system of claim 1, wherein the boost circuit power supply comprises a battery, and the external power supply is to charge the battery.

9. The electrochromic system of claim 1, further comprising one or more sense voltage terminals configured to measure a sense voltage of the electrochromic device.

10. The electrochromic system of claim 9, wherein the electrochromic device comprises an electrochromic window.

11. The electrochromic system of claim 1, further comprising an ammeter and an integrator configured to measure an amount of charge transferred to the electrochromic device.

12. The electrochromic system of claim 1, further comprising electrically conductive layers with electrical properties that vary as a function of position.

13. The electrochromic system of claim 1, further comprising an ion conductor with thickness greater than 100 microns.

14. A method for controlling an electrochromic device, comprising:
applying an amount of power to the electrochromic device from an external power supply, that is less than or equal to a limited amount of power;
determining an amount of power required by the electrochromic device;
supplying power to the electrochromic device from a boost circuit power supply that is coupled to the electrochromic device, responsive to the amount of power required by the electrochromic device being larger than the limited amount of power, wherein a maximum power output of the external power supply is smaller than a maximum power output of the boost circuit power supply and
the external power supply providing power to recharge a battery for the boost circuit power supply, during time periods when the amount of power required by the electrochromic device is less than the limited amount of power, wherein the external power provided is equal to or less than the limited amount of power.

15. The method of claim 14, further comprising:
applying a constant supply current to the electrochromic device from the external power supply, boost circuit power supply, or both power supplies;
determining an amount of charge transferred to the electrochromic device, as a function of time and current supplied to the electrochromic device;
ceasing the applying the constant supply current from the external power supply, boost circuit power supply, or both power supplies, responsive to a sense voltage reaching a sense voltage limit;
applying one of a variable voltage or a variable current to the electrochromic device from the external power supply, boost circuit power supply, or both power supplies to maintain the sense voltage at the sense voltage limit, responsive to the sense voltage reaching the sense voltage limit; and
terminating the applying the variable voltage or the variable current to the electrochromic device from the external power supply, boost circuit power supply, or both power supplies, responsive to the determined amount of charge reaching a target amount of charge.

16. The method of claim 14, further comprising:
the external power supply providing a decreased amount of power to recharge the battery for the boost circuit power supply, during time periods when the power required by the electrochromic device is less than the limited amount of power, and when the battery is more than 90% charged, wherein the decreased amount of power provided is less than the limited amount of power.

* * * * *